United States Patent
Kim et al.

(10) Patent No.: US 11,206,601 B2
(45) Date of Patent: Dec. 21, 2021

(54) METHOD AND APPARATUS FOR EFFICIENTLY PROVIDING ACCESS CONTROL CONFIGURATION INFORMATION IN NEXT-GENERATION WIRELESS COMMUNICATION SYSTEM

(71) Applicant: Samsung Electronics Co., Ltd., Suwon-si (KR)

(72) Inventors: Sangbum Kim, Suwon-si (KR); Alexander Sayenko, Suwon-si (KR); Seungri Jin, Suwon-si (KR); Himke Van Der Velde, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/760,734

(22) PCT Filed: Apr. 4, 2019

(86) PCT No.: PCT/KR2019/004009
§ 371 (c)(1),
(2) Date: Apr. 30, 2020

(87) PCT Pub. No.: WO2019/194605
PCT Pub. Date: Oct. 10, 2019

(65) Prior Publication Data
US 2020/0351754 A1    Nov. 5, 2020

(30) Foreign Application Priority Data

Apr. 5, 2018 (KR) .................. 10-2018-0039855

(51) Int. Cl.
*H04W 48/02* (2009.01)
*H04W 76/27* (2018.01)
(Continued)

(52) U.S. Cl.
CPC .......... *H04W 48/02* (2013.01); *H04W 48/12* (2013.01); *H04W 76/27* (2018.02); *H04W 84/042* (2013.01)

(58) Field of Classification Search
CPC ..... H04W 48/02; H04W 76/27; H04W 48/12; H04W 84/042; H04W 72/0406; H04W 72/0493
See application file for complete search history.

(56) References Cited

U.S. PATENT DOCUMENTS

2017/0135028 A1   5/2017   Lee et al.
2017/0257791 A1   9/2017   Rajadurai et al.
(Continued)

FOREIGN PATENT DOCUMENTS

KR   10-2018-0007697 A   1/2018
WO   2016/006980 A1   1/2016

OTHER PUBLICATIONS

Samsung, 'Remaining SIB1 contents', R2-1803428, 3GPP TSG RAN WG2 #101, Athens, Greece, See section 2.1.2. Dated Feb. 16, 2018.

(Continued)

*Primary Examiner* — Diane D Mizrahi
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The disclosure also relates to a method and an apparatus for configuring barring configuration information (Continued)

of a user equipment (UE). A method of a UE according to the disclosure comprises: receiving a system information block (SIB) including barring information per access category; identifying an access category relating to an access attempt; identifying an index included in barring information corresponding to the access category; and determining whether to bar the access attempt based on access control information indicated by the index.

14 Claims, 24 Drawing Sheets

(51) Int. Cl.
*H04W 48/12* (2009.01)
*H04W 84/04* (2009.01)

(56) References Cited

U.S. PATENT DOCUMENTS

2018/0020382 A1 1/2018 Kim et al.
2019/0357119 A1* 11/2019 Hong .................... H04W 48/08

OTHER PUBLICATIONS

Huawei et al., 'Access control signaling design', R2-1803544, 3GPP TSG RAN WG2 #101, Athens, Greece, See section 2; and Table 1. Dated Feb. 16, 2018.

Spreadtrum Communications, 'Barring information encoding for 5G unified access control', R2-1712269, 3GPP TSG RAN WG2 #100, Reno, USA, See section 2. Dated Nov. 16, 2017.

ZTE Corporation et al., 'Consideration on the NR system information structure', R2-1800450, 3GPP TSG RAN WG2 Meeting #AH1801, Vancouver, Canada, See sections 2.1-2.2. Dated Jan. 1, 2018.

Spreadtrum Communications: "Barring information encoding for 5G unified access control", 3GPP Draft; R2-1800273_UAC_Barring_Check_Info_Encoding, 3rd Generation Partnership Project (3GPP), Mobile Competence Centre; 650, Route Des Lucioles; F-06921 Sophia-Antipolis Cedex; France vol. RAN WG2, No. Vancouver, Canada; Jan. 22, 2018-Jan. 26, 2018. Jan. 11, 2018, XP051385639, http://www.3gpp.org/ftp/tsg%5Fran/WG2%5FRL2/TSGR2%5FAHs/2018%5F01%5FNR/Docs/.

Ericsson: "Signaling of access control parameters", 3GPP Draft; R2-1802353—Signaling of Access Control Parameters, 3rd Generation Partnership Project (3GPP), Mobile Competence Centre; 650, Route Des Lucioles; F-06921 Sophia-Antipolis Cedex; France vol. RAN WG2, No. Athens, Greece; Feb. 26, 2018-Mar. 2, 2018. Feb. 15, 2018, XP051399496, Retrieved from the Internet:URL: http://www.3gpp.org/ftp/tsg%5Fran/WG2%5FRL2/TSGR2%5F101/Docs/.

NTT Docomo et al: "Clarification on access control requirement", 3GPP Draft; 22261_CR0040R5_(REL-15)_S1-173548, 3rd Generation Partnership Project (3GPP), Mobile Competence Centre; 650, Route Des Lucioles ; F-06921 Sophia-Antipolis Cedex ; France, vol. SA WG1, No. Guilin, China; Aug. 21, 2017-Aug. 25, 2017. Sep. 11, 2017, XP051326261, Retrieved from the Internet:URL: http://www.3gpp.org/ftp/Meetings_3GPP_SYNC/SA/Docs/.

LG Electronics Inc: "Optimization of barring information for UAC", 3GPP Draft; R2-1805941 Optimization of UAC Barring Information, 3rd Generation Partnership Project (3GPP), Mobile Competence Centre; 650, Route Des Lucioles; F-06921 Sophia-Antipolis Cedex; France vol. RAN WG2, No. Sanya, China; Apr. 16, 2018-Apr. 20, 2018. Apr. 6, 2018, XP051416297, Retrieved from the Internet: URL: http://www.3gpp.org/ftp/tsg%5Fran/WG2%5FRL2/TSGR2%5F101bis/Docs/.

European Search Report dated Feb. 12, 2021, issued in European Application No. 19782127.5-1212 / 3735798.

* cited by examiner

[Fig. 1a]
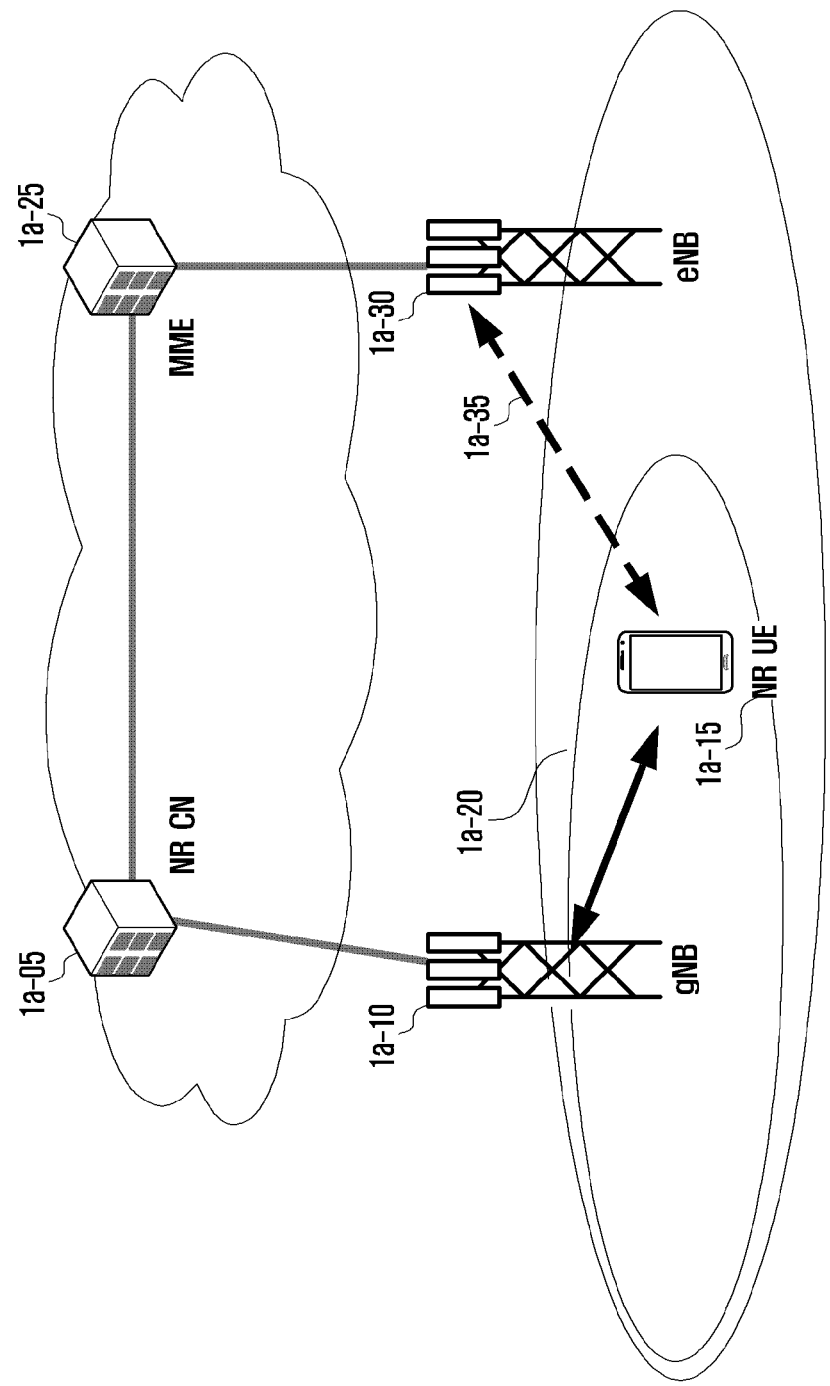

[Fig. 1b]
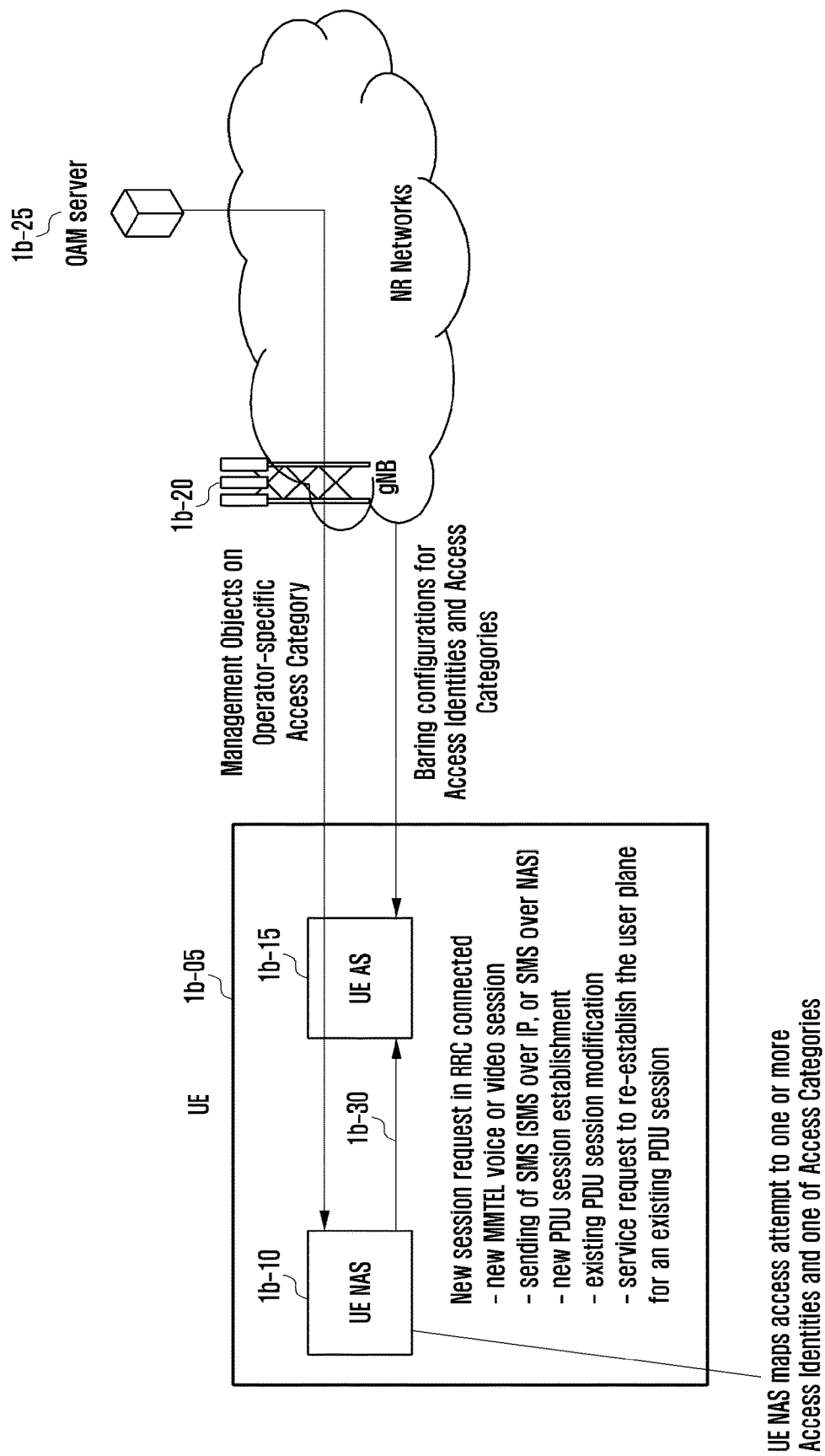

[Fig. 1c]
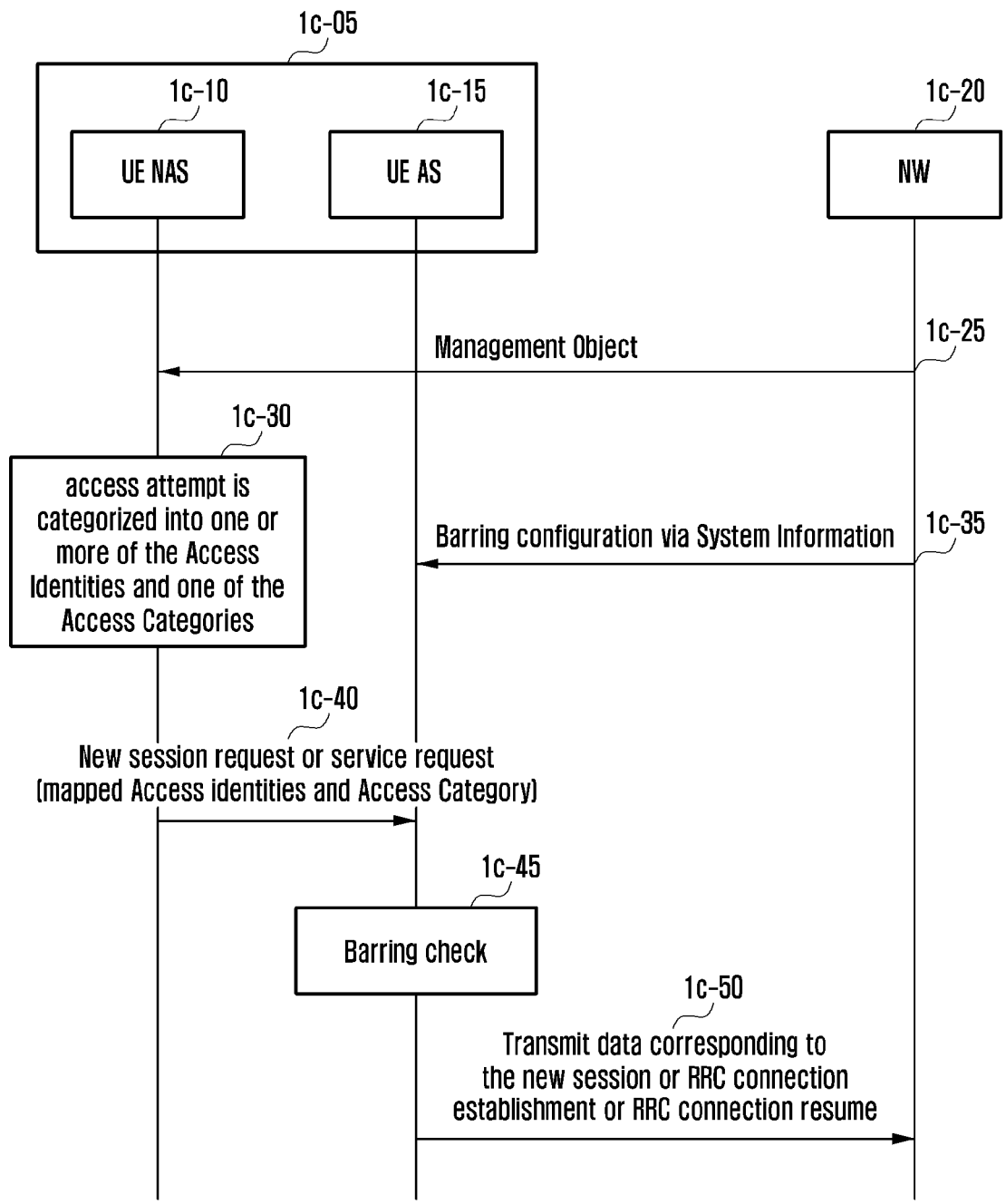

[Fig. 1d]
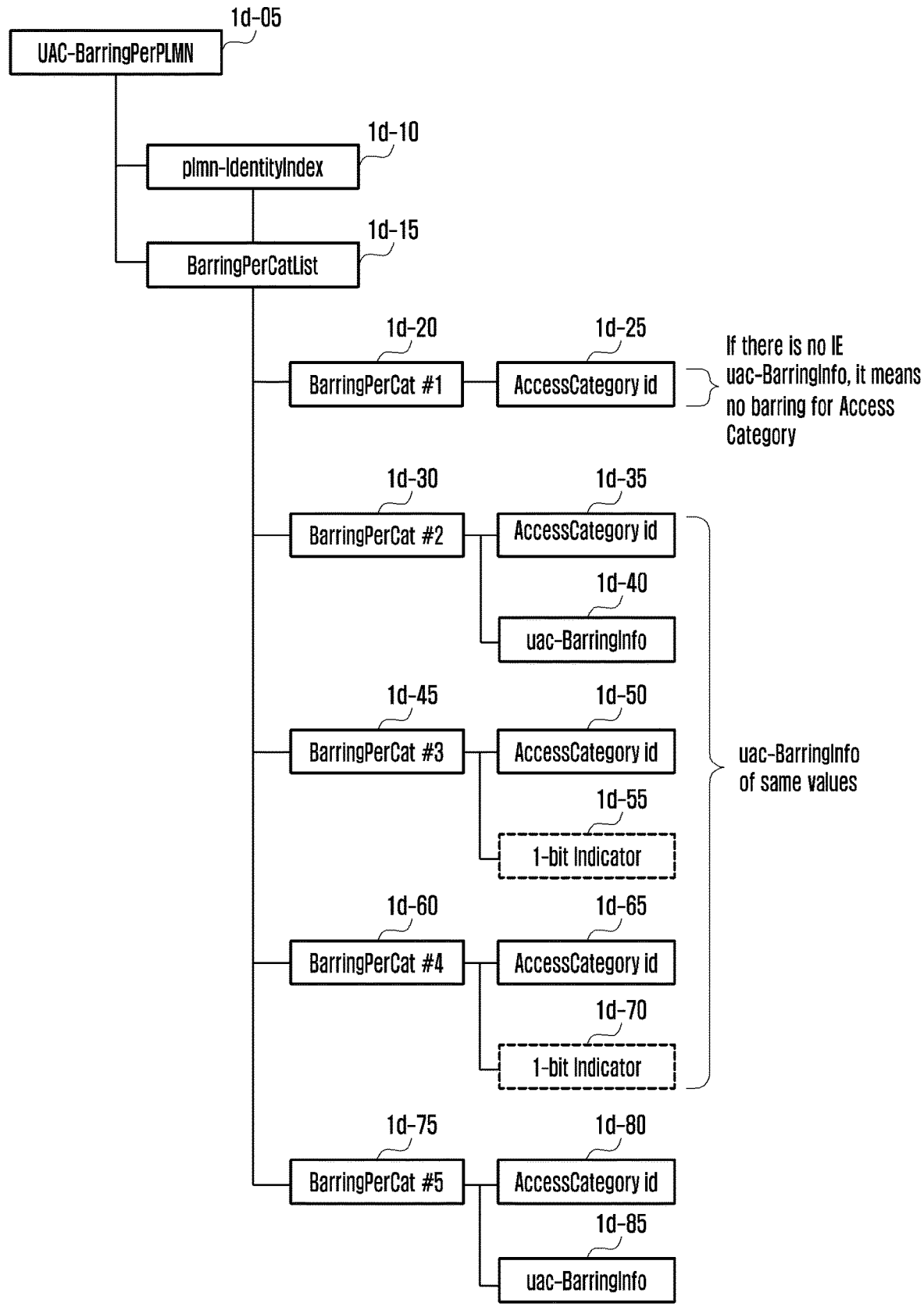

[Fig. 1e]
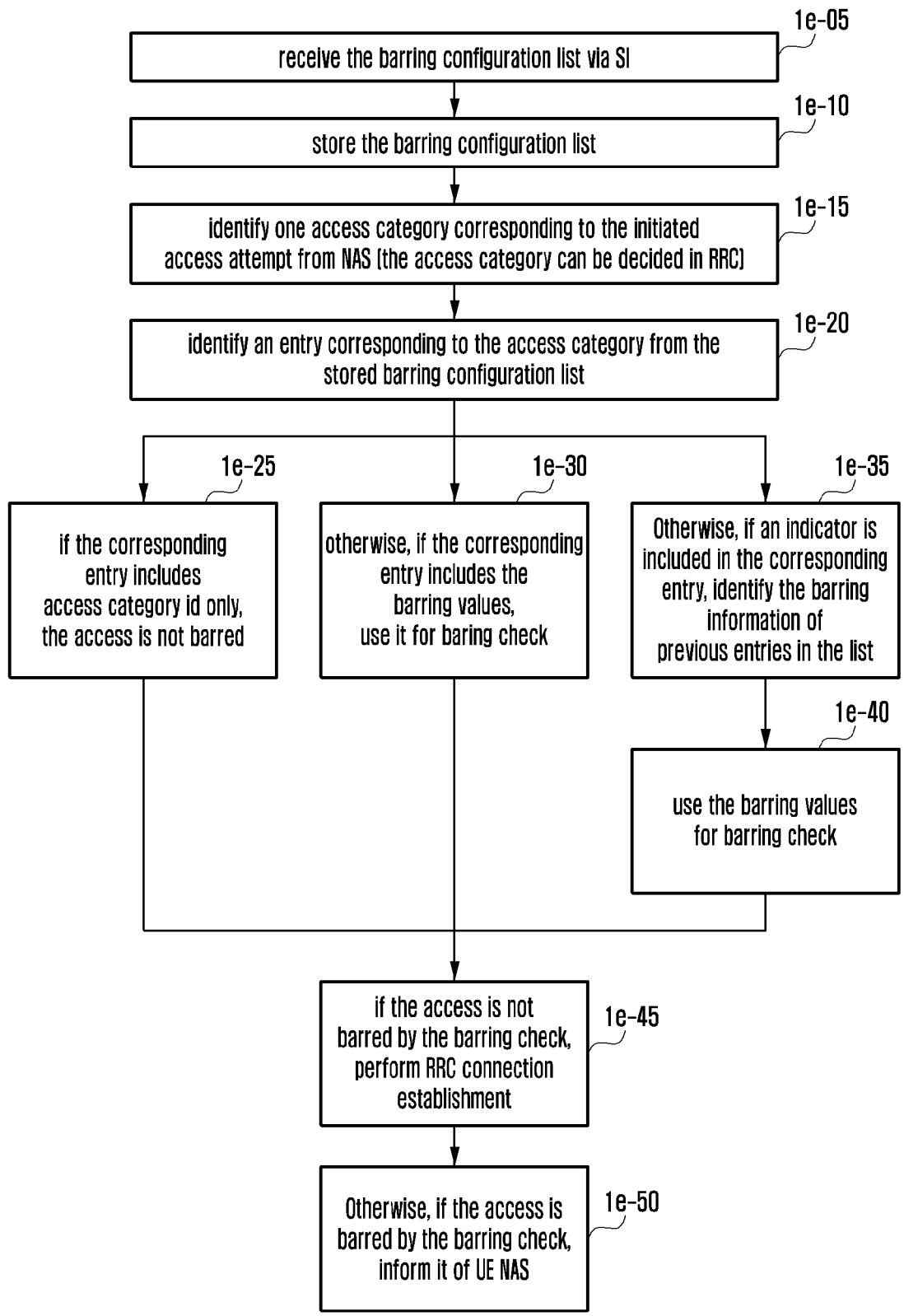

[Fig. 1f]
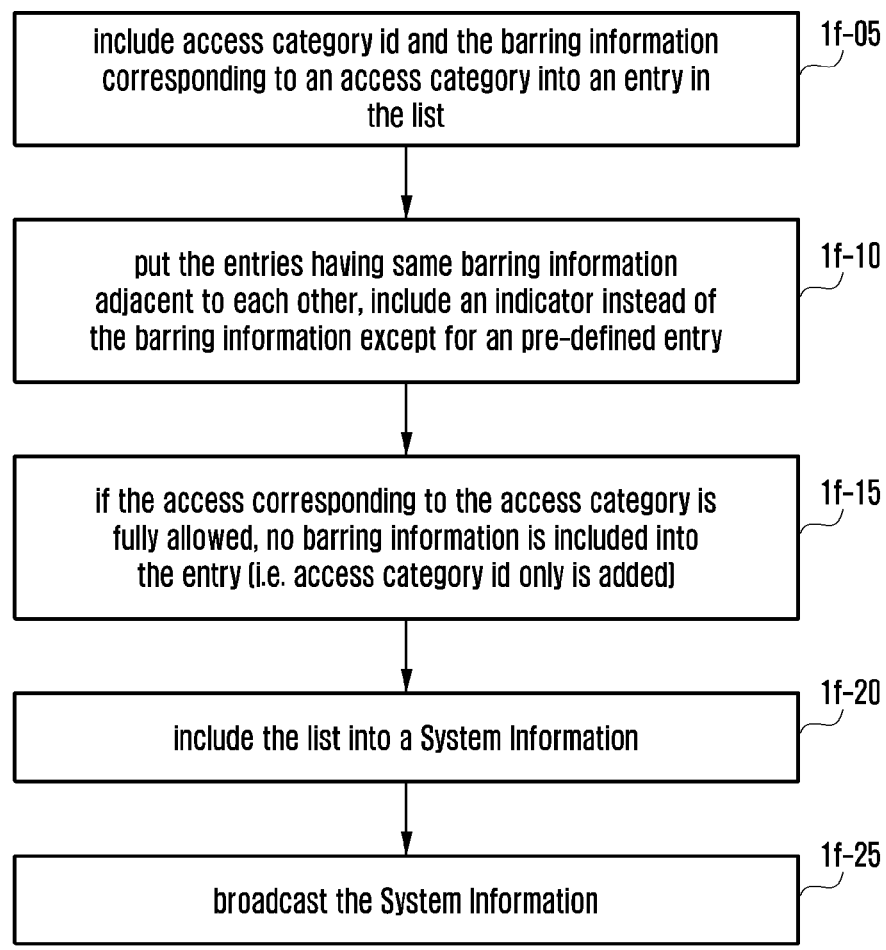

[Fig. 1g]
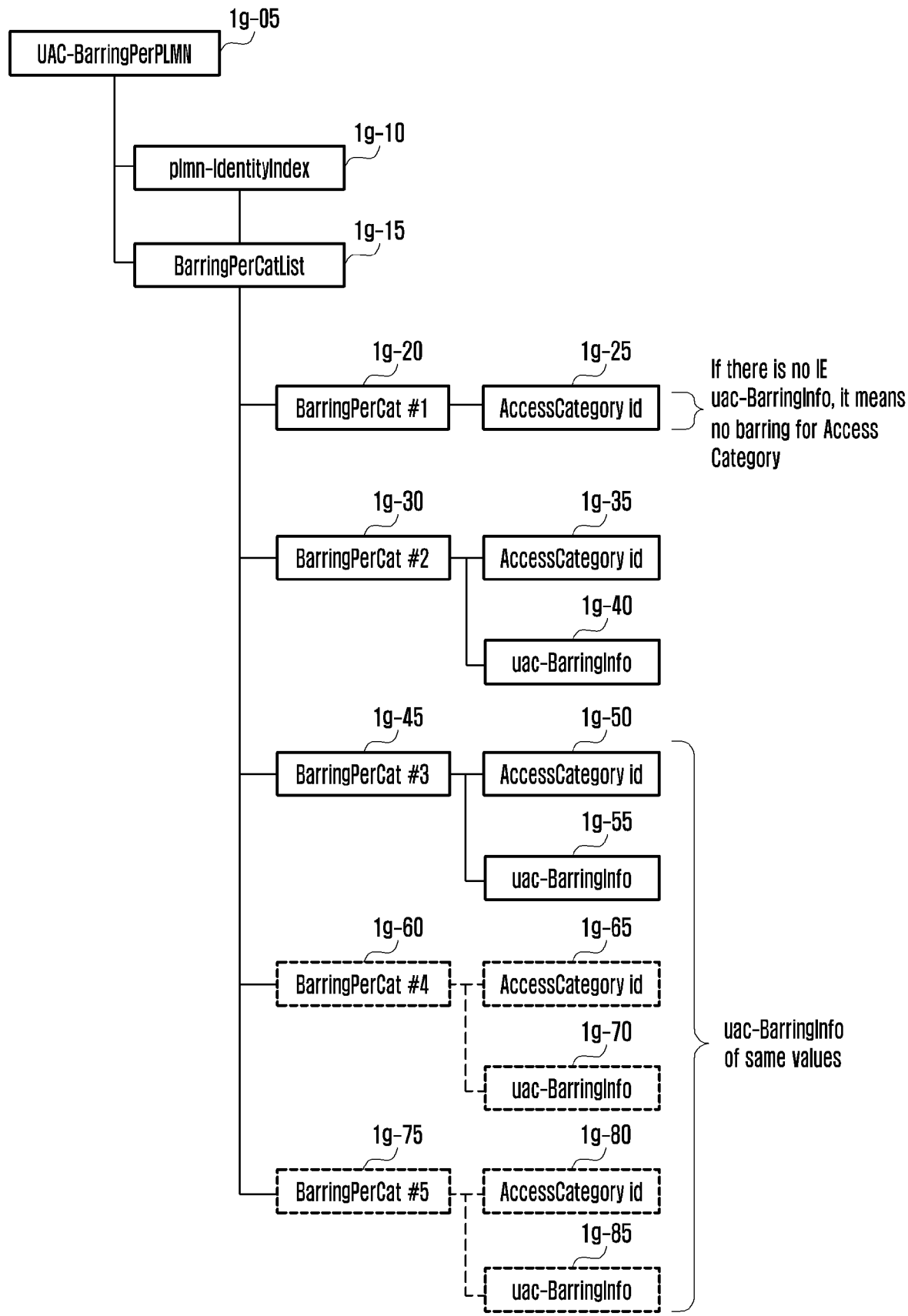

[Fig. 1h]
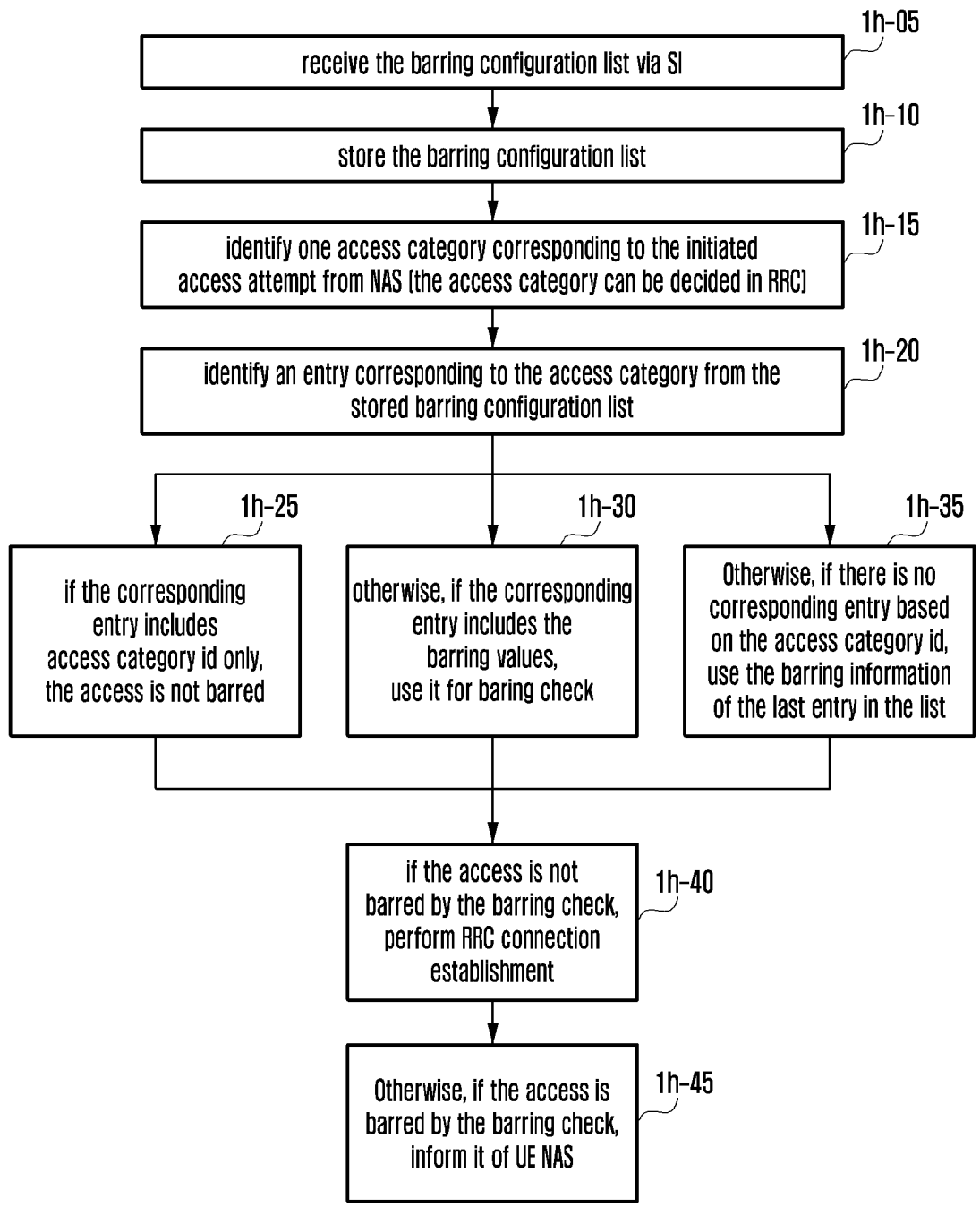

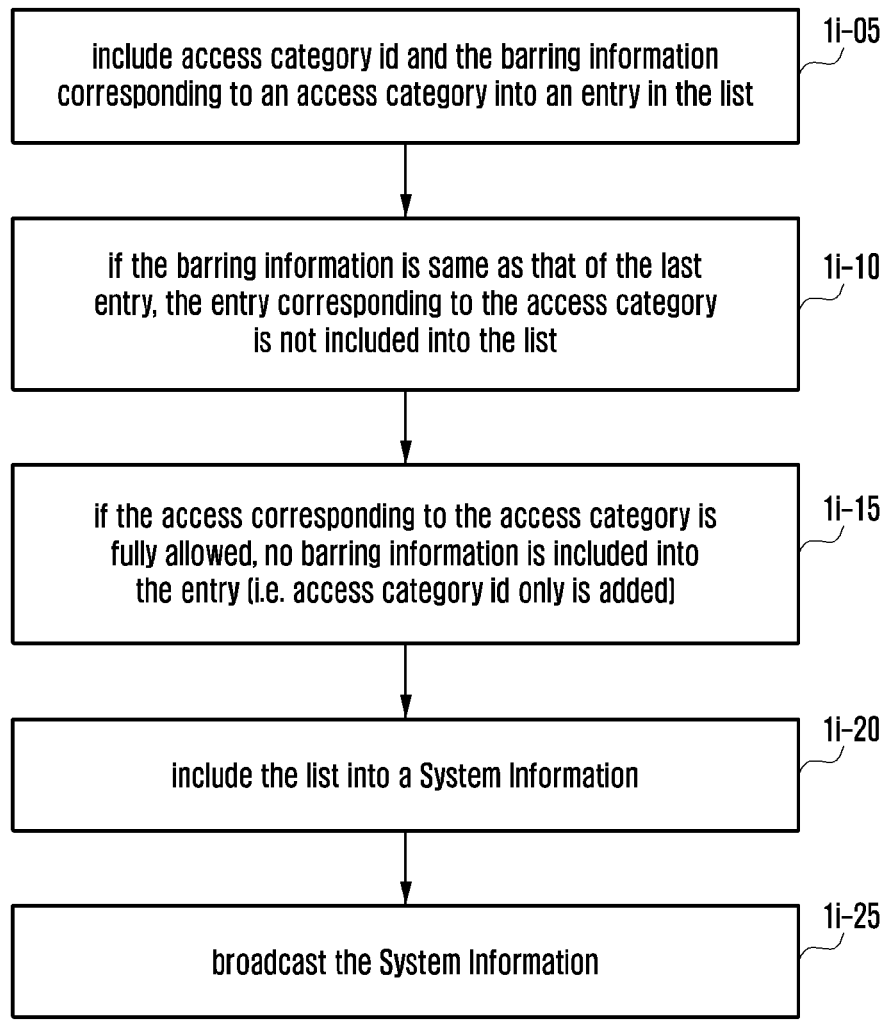
[Fig. 1i]

[Fig. 1j]
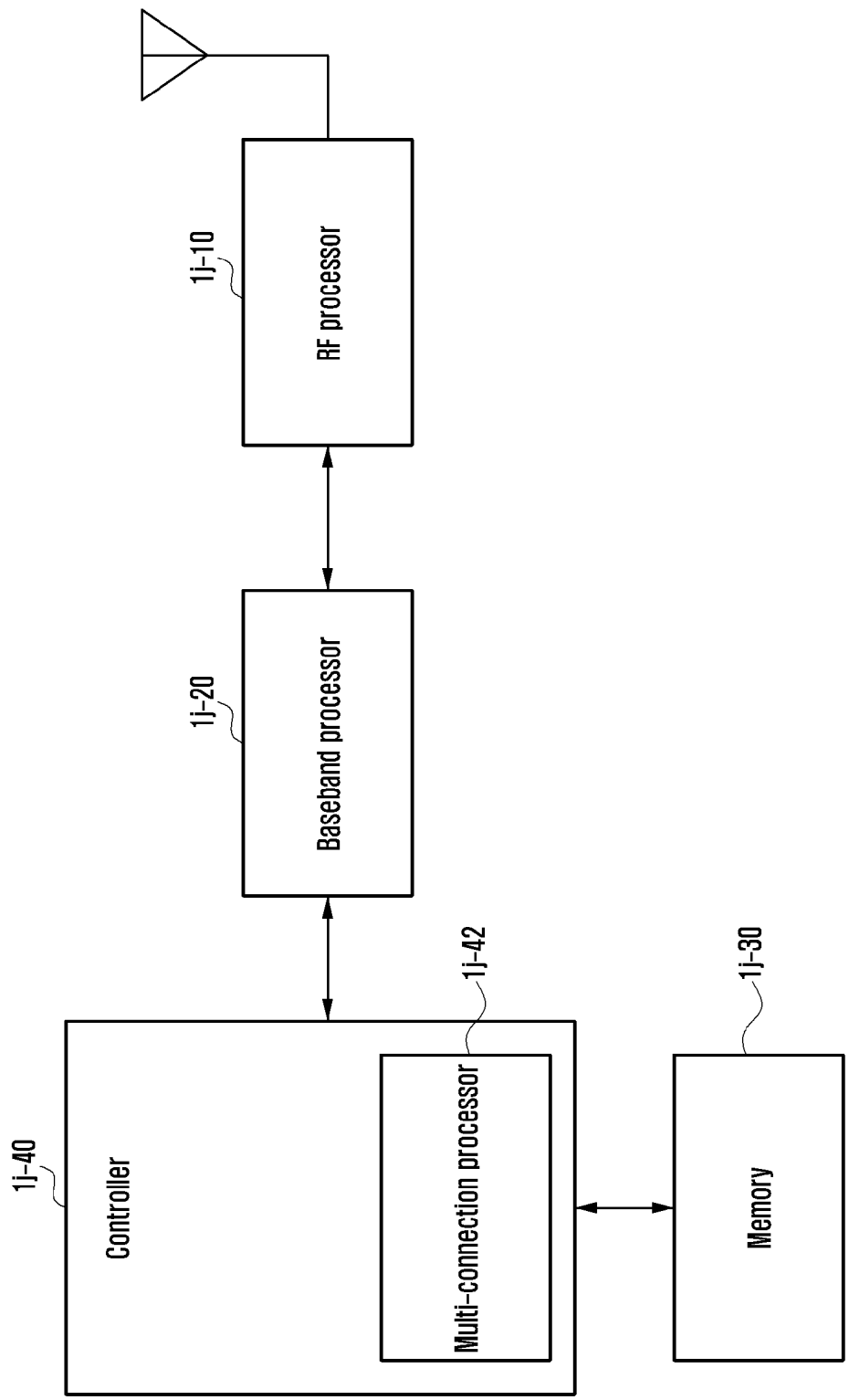

[Fig. 1k]
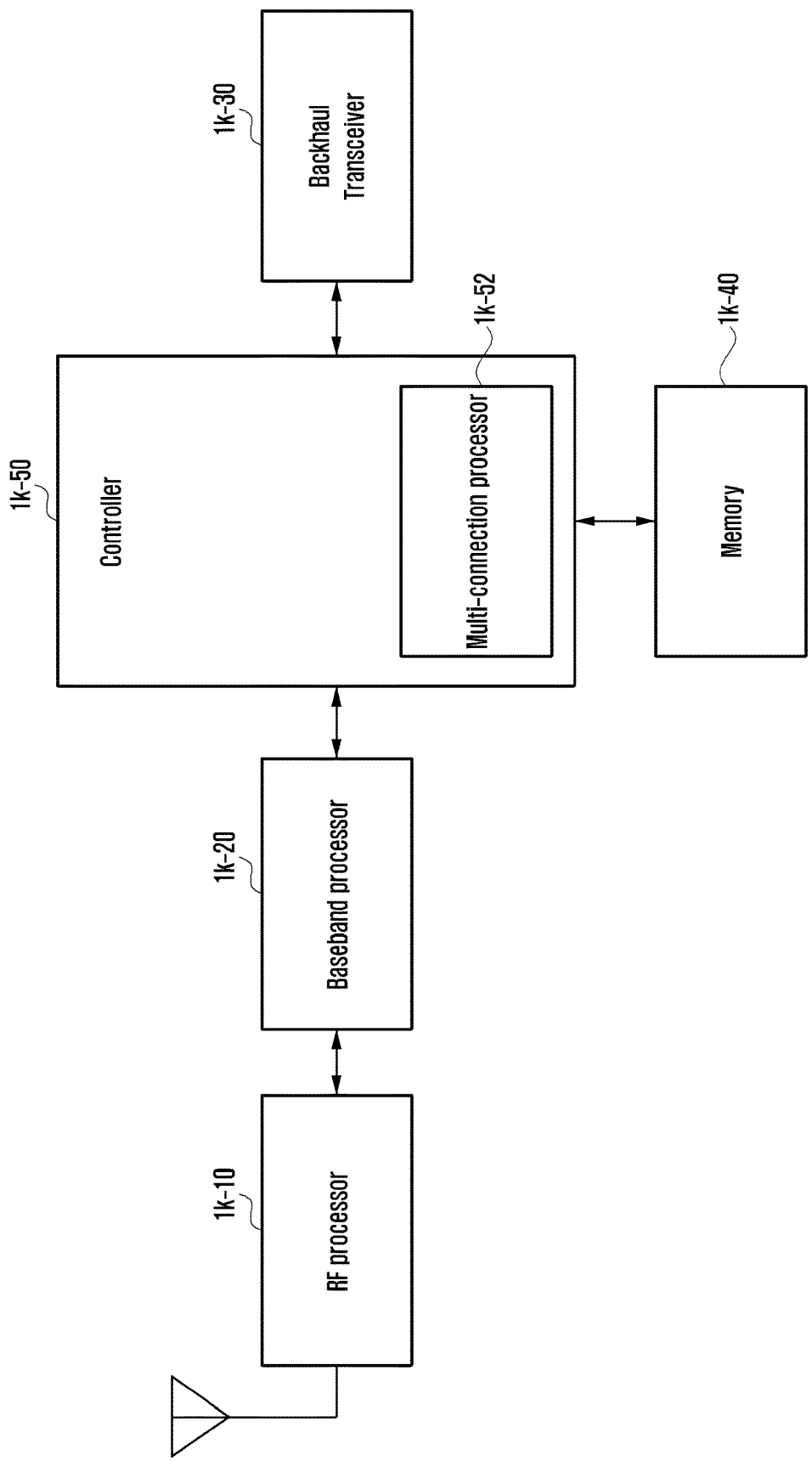

[Fig. 2a]
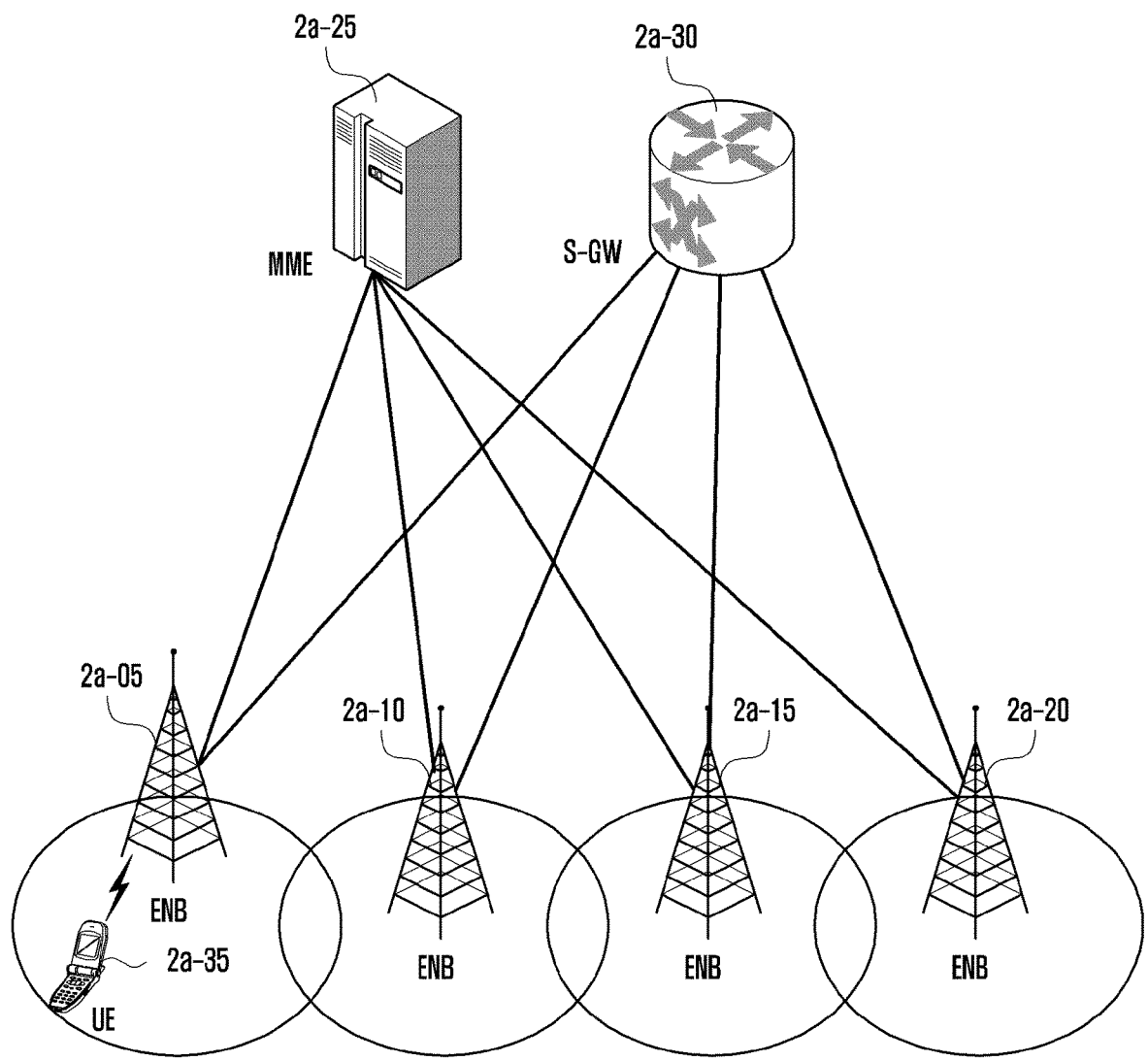

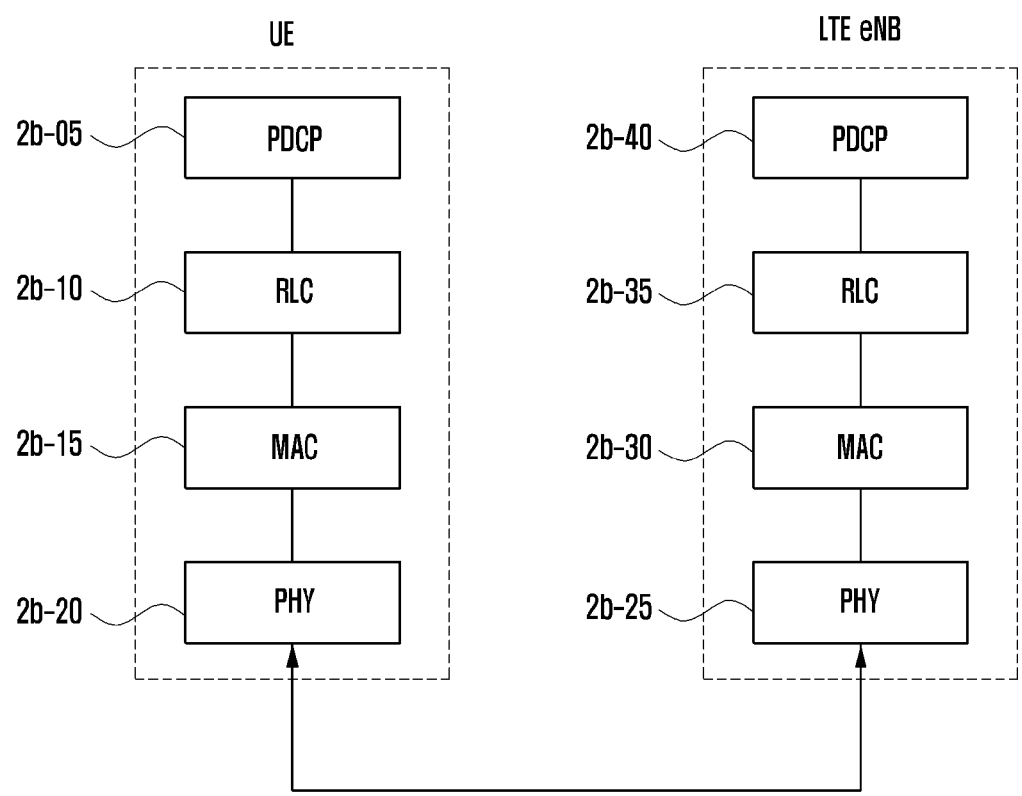
[Fig. 2b]

[Fig. 2c]
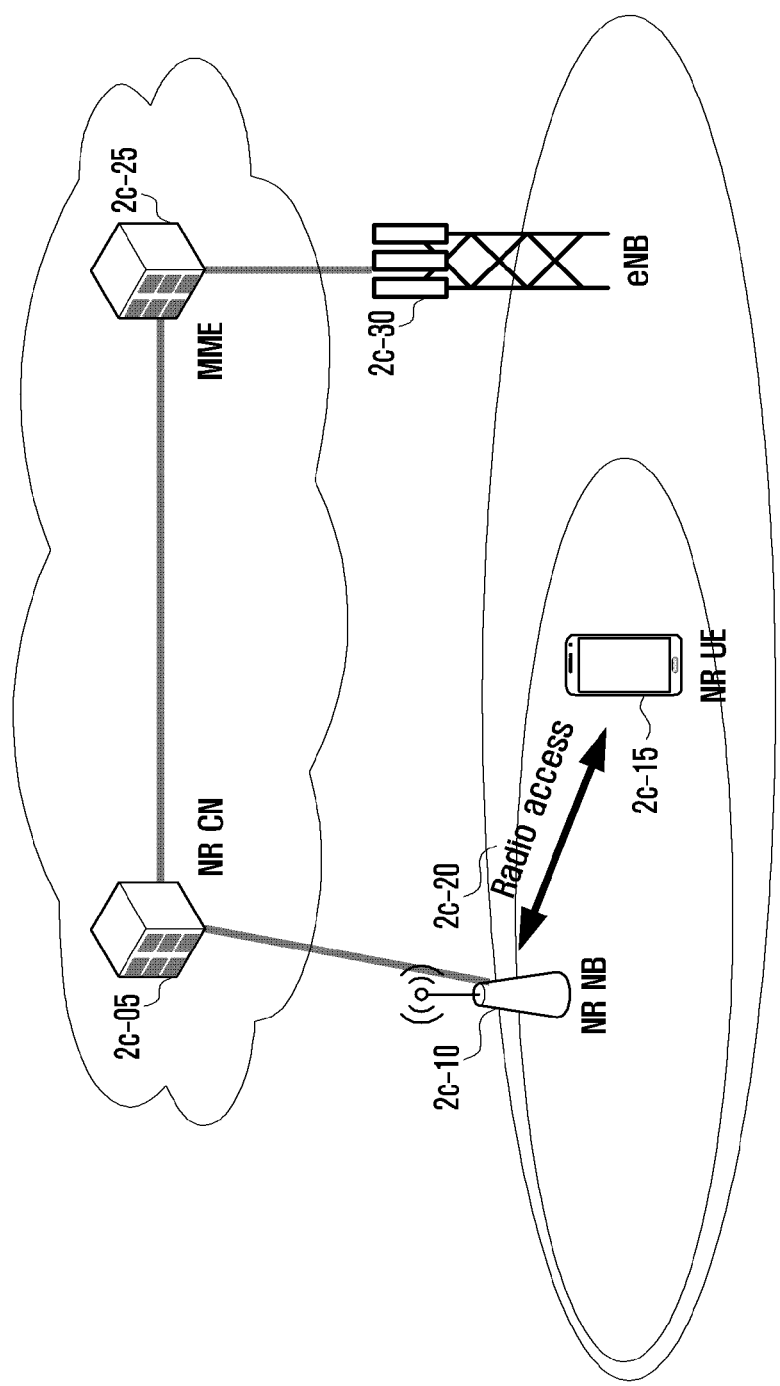

[Fig. 2d]
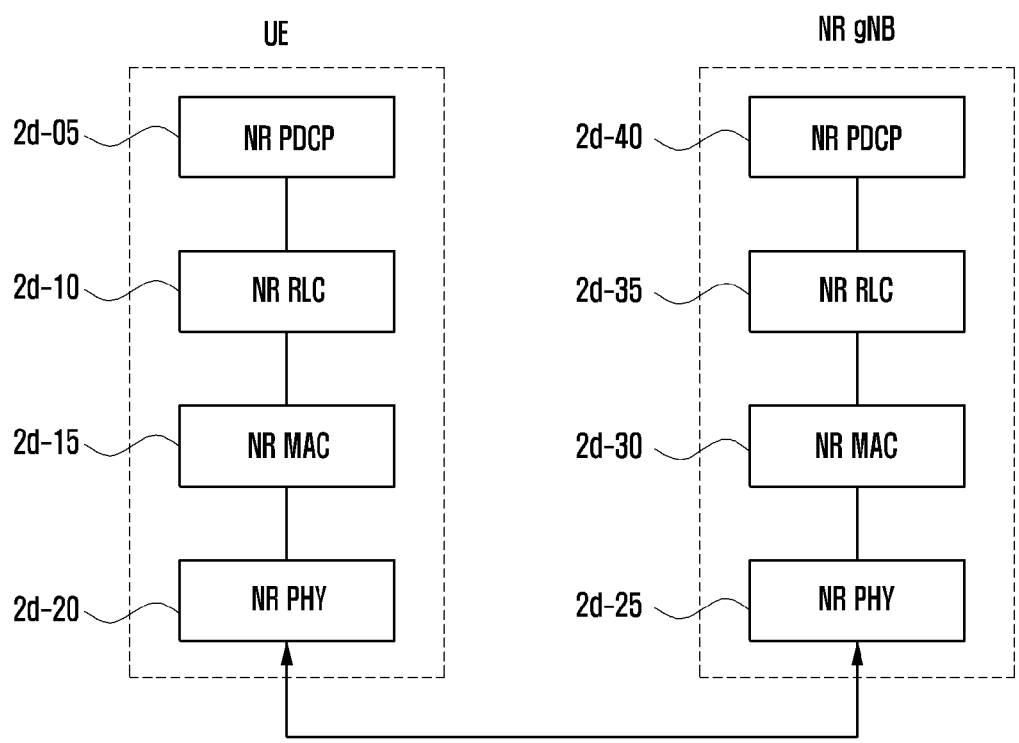

[Fig. 2e]
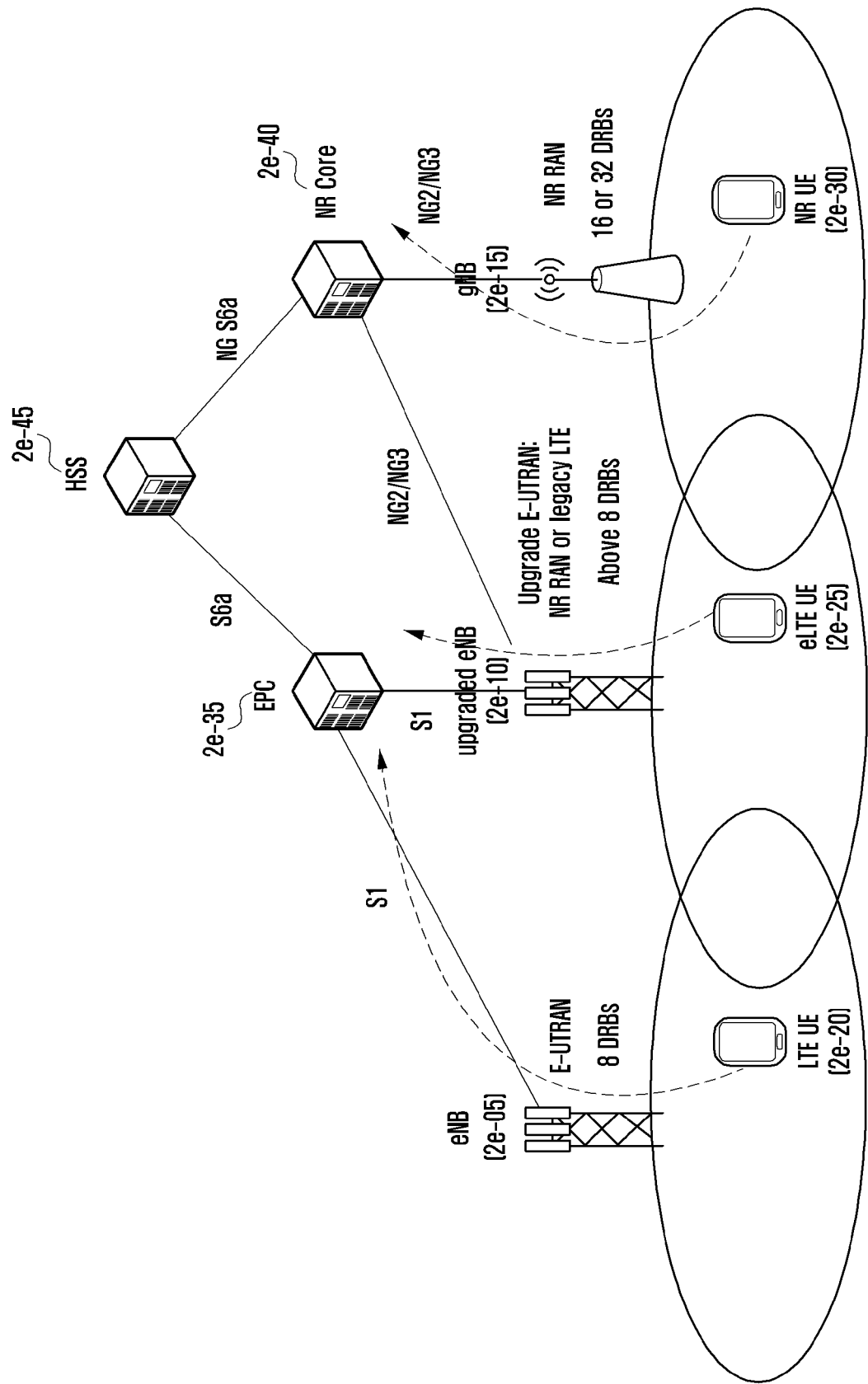

[Fig. 2f]
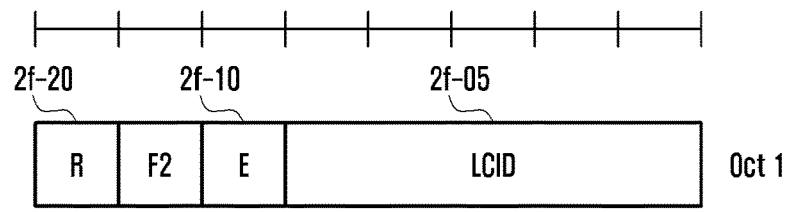
[2f-A] R/F2/E/LCID sub-header
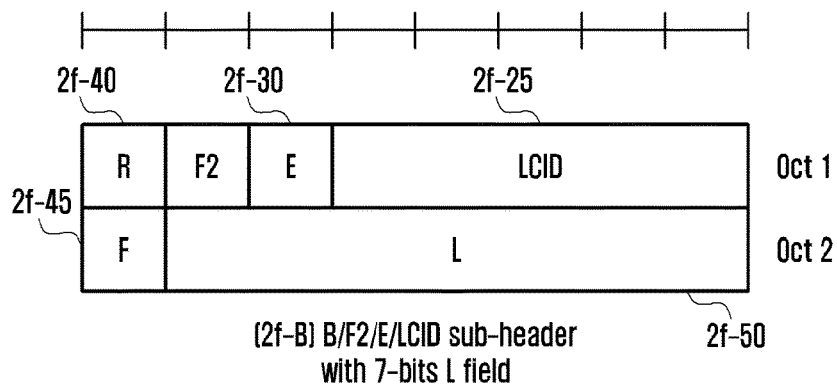
[2f-B] B/F2/E/LCID sub-header
with 7-bits L field
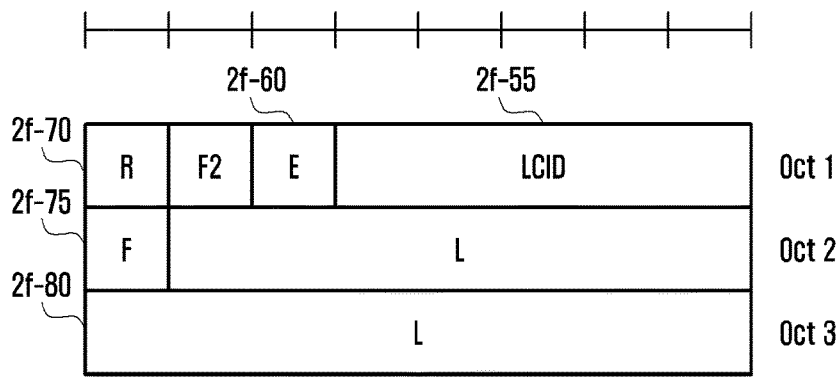
[2f-C] R/F2/E/LCID/F/L sub-header
with 15-bits L field
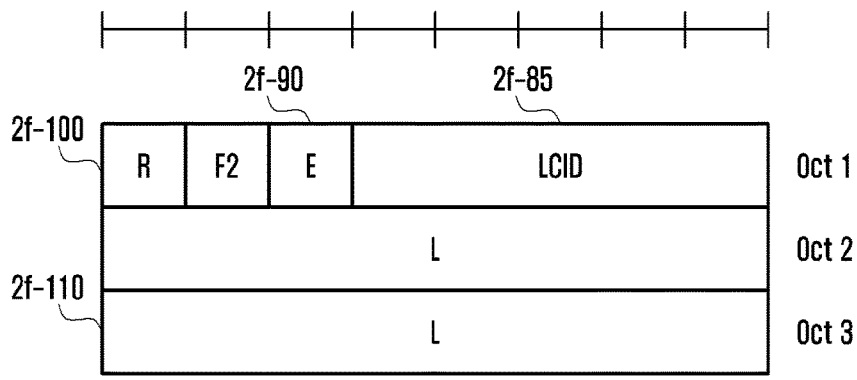
[2f-D] R/F2/E/LCID/L sub-header
with 16-bits L field

[Fig. 2g]
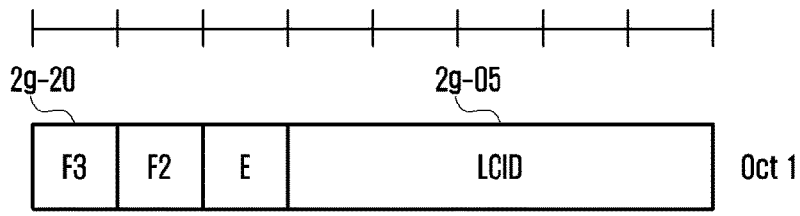
(2g-A) F3/F2/E/LCID sub-header
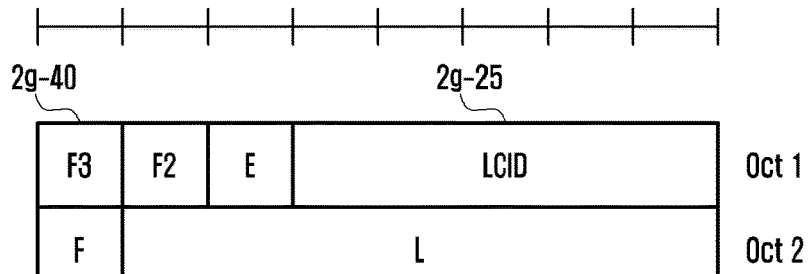
(B) F3/F2/E/LCID/F/L sub-header
with 7-bits L field
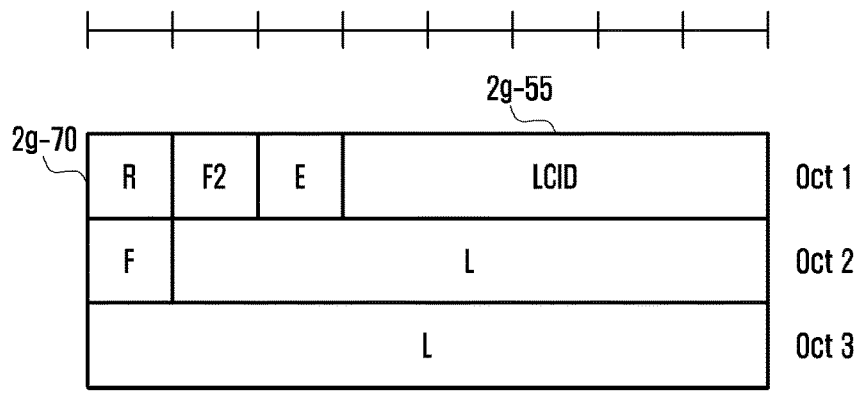
(C) F3/F2/E/LCID/F/L sub-header
with 15-bits L field
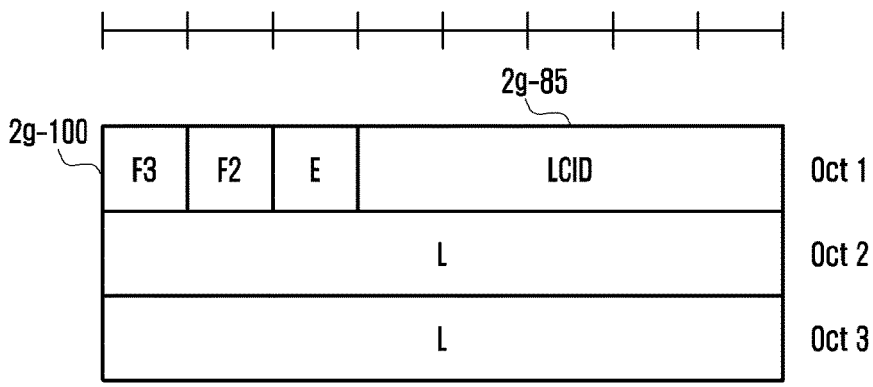
(D) F3/F2/E/LCID/L sub-header
with 16-bits L field

[Fig. 2h]
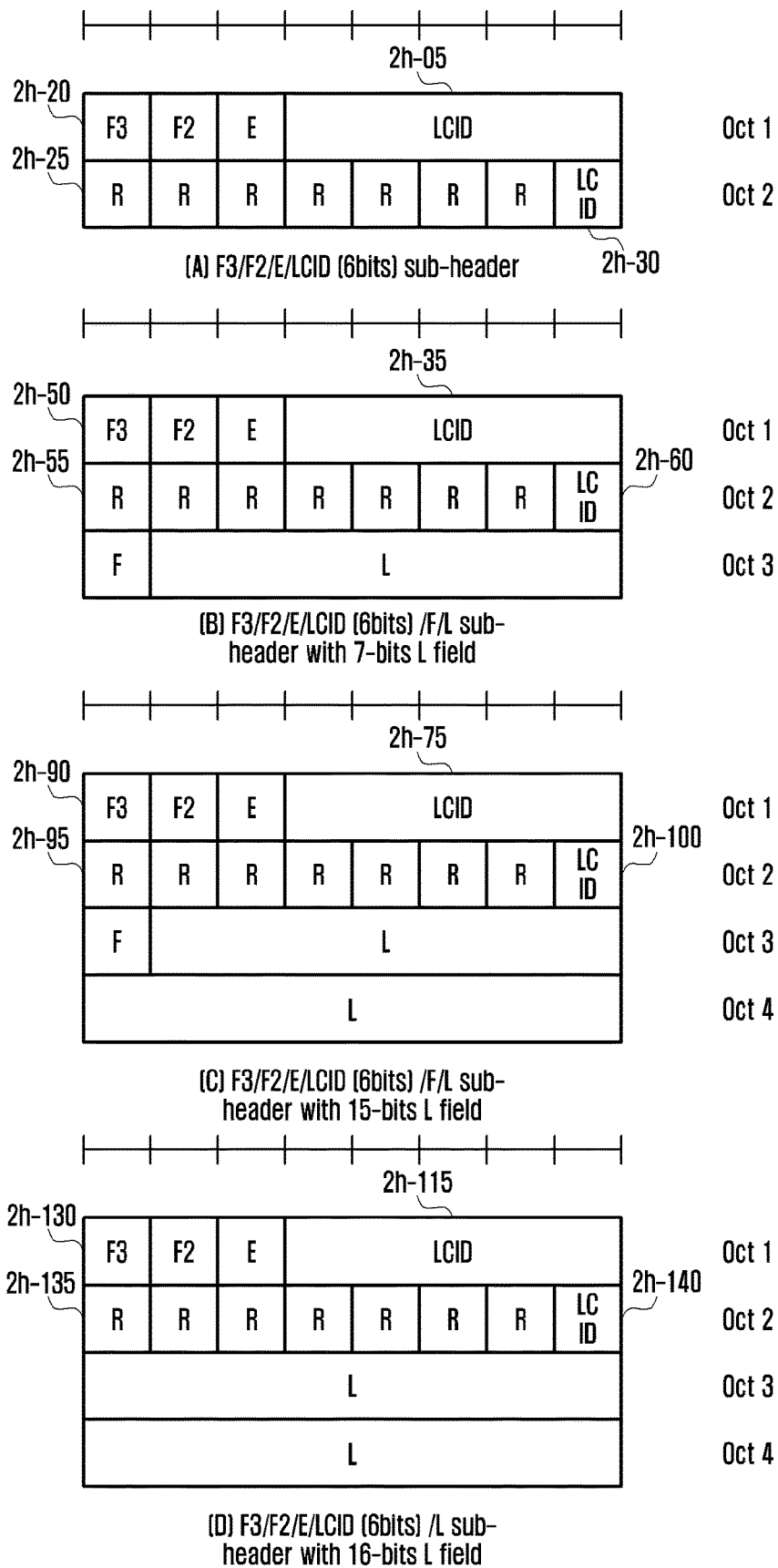

[Fig. 2i]
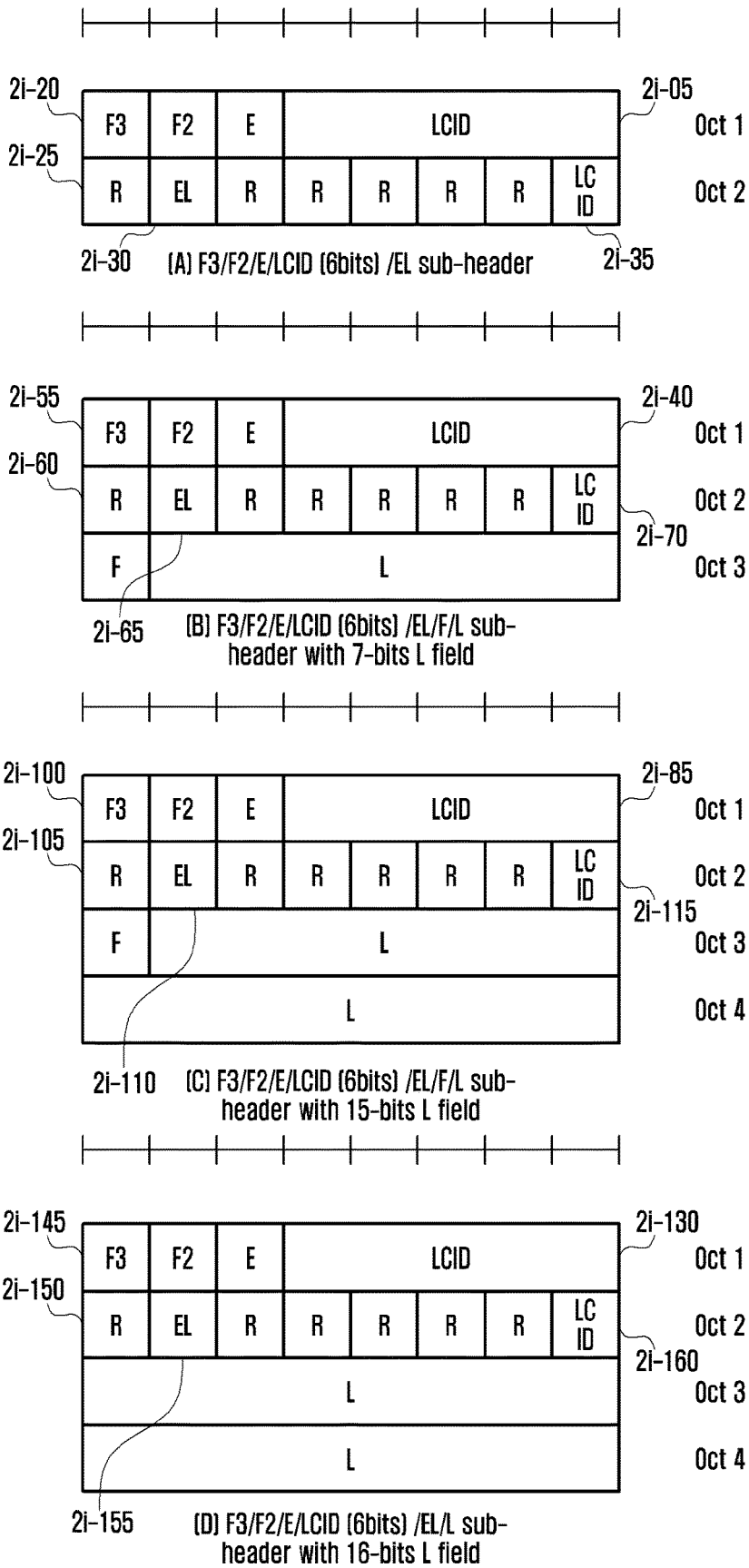

[Fig. 2j]
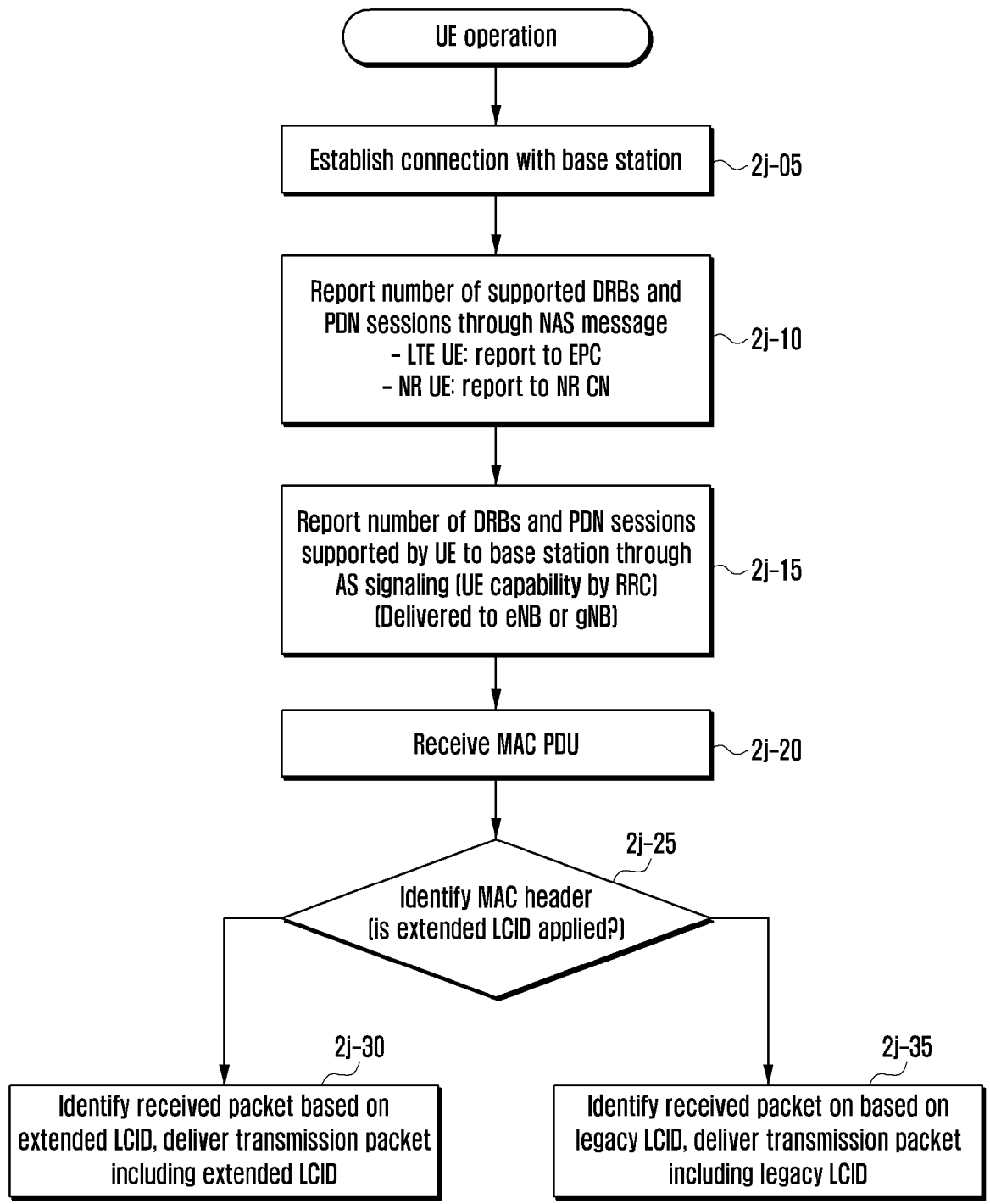

[Fig. 2k]
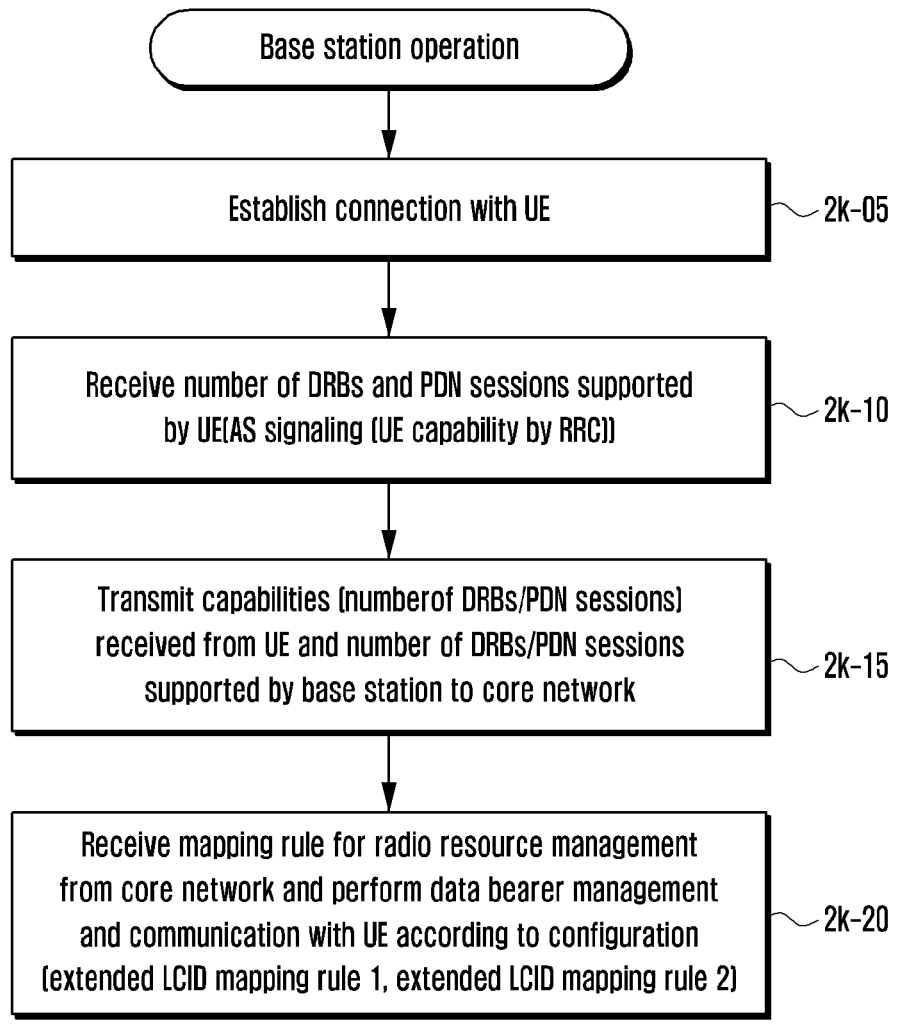

[Fig. 21]
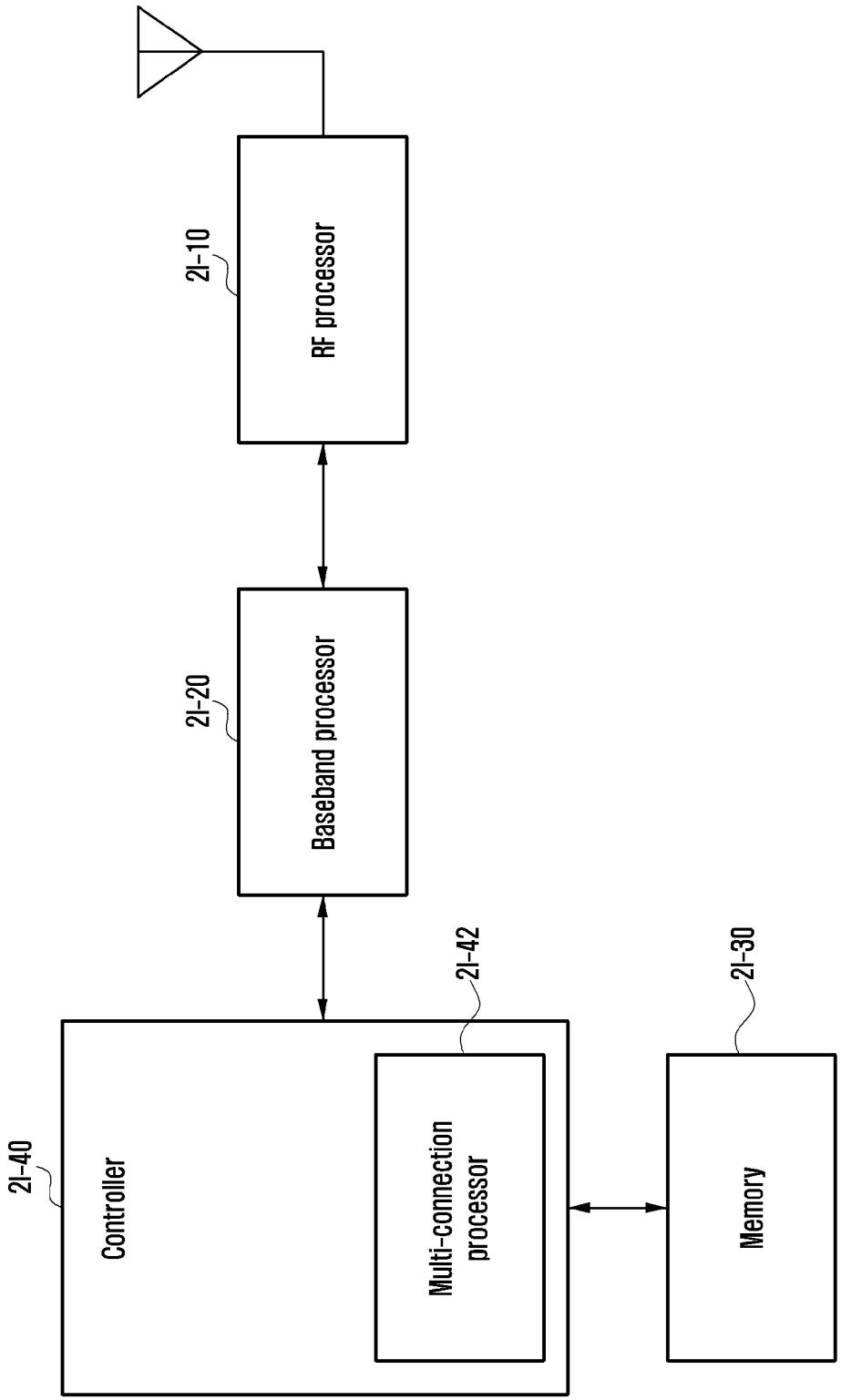

[Fig. 2m]
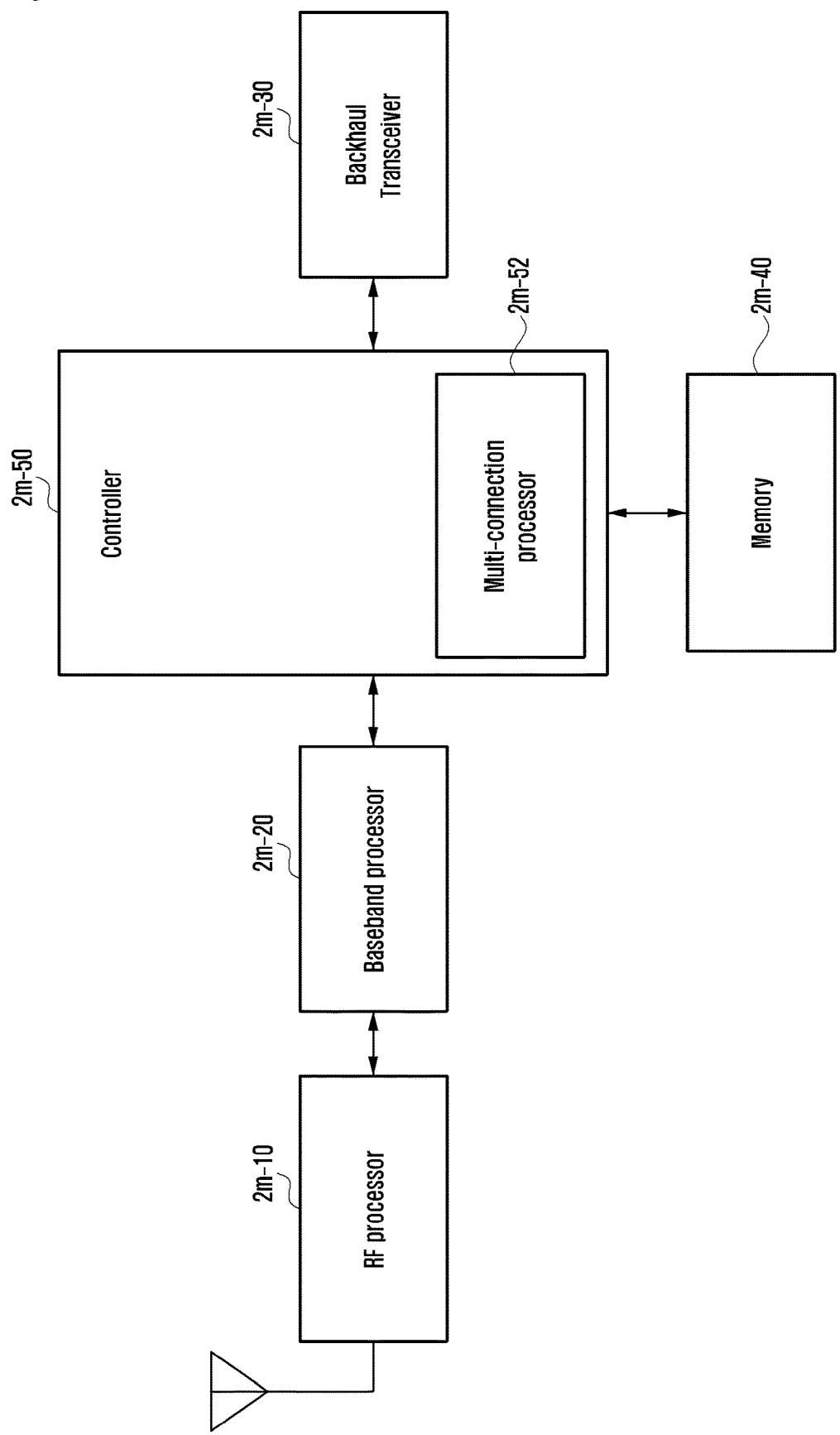

METHOD AND APPARATUS FOR EFFICIENTLY PROVIDING ACCESS CONTROL CONFIGURATION INFORMATION IN NEXT-GENERATION WIRELESS COMMUNICATION SYSTEM

TECHNICAL FIELD

The disclosure relates to a next-generation mobile communication system and, more particularly, to a method and an apparatus for efficiently providing access control configuration information in a next-generation mobile communication system.

The disclosure also relates to a method and an apparatus for applying an extended logical channel identifier in a next-generation mobile communication system.

BACKGROUND ART

The above information is presented as background information only to assist with an understanding of the disclosure. No determination has been made, and no assertion is made, as to whether any of the above might be applicable as prior art with regard to the disclosure.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid Frequency-shift keying (FSK) and Quadrature Amplitude Modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet has evolved from a human-centered connection network, in which humans create and consume information, into an Internet of things (IoT) network, in which distributed components, such as objects, may exchange and process information. Internet-of-everything (IoE) technology, in which big-data processing technology is combined with the IoT through connection with a cloud server and the like, has also emerged. As technological elements such as sensing technology, wired/wireless communication and network infrastructure, service interface technology, and security technology are required to implement IoT, technologies for sensor networks, machine-to-machine (M2M) communication, and machine-type communication (MTC) have recently been studied for connecting objects. In an IoT environment, an intelligent Internet Technology (IT) service that collects and analyzes data generated from connected objects may be provided to create new value in human lives. The IoT is applicable to the fields of smart homes, smart buildings, smart cities, smart cars or connected cars, smart grids, health care, smart home appliances, advanced medical care services, and the like through convergence and integration of existing information technology with various industries.

Accordingly, various attempts are being made to apply a 5G communication system to the IoT network. For example, 5G communication technologies, such as a sensor network, M2M communication, and MTC, are implemented by beamforming, MIMO, and array-antenna schemes. Applying a cloud radio access network (RAN) as the big-data processing technology described above is an example of the convergence of 5G technology and IoT technology.

DISCLOSURE OF INVENTION

Technical Problem

An aspect of the disclosure is to propose a method for efficiently configuring barring configuration information about a user equipment (UE) and for transmitting and receiving the barring configuration information to the UE.

When a base station supporting an LTE system can be connected to a core network of a next-generation mobile communication system, the current LTE system does not have a logical channel identifier to identify the number of radio bearers supported by the next-generation mobile communication system and thus cannot support the number of radio bearers. An aspect of the disclosure is to propose a method for solving this problem.

Solution to Problem

In accordance with an aspect of the disclosure, a method of a UE comprises: receiving a system information block (SIB) including barring information per access category; identifying an access category relating to an access attempt; identifying an index included in barring information corresponding to the access category; and determining whether to bar the access attempt based on access control information indicated by the index.

In accordance with an aspect of the disclosure, a UE comprises: a transceiver; and a controller configured to receive a system information block (SIB) including barring information per access category, to identify an access category relating to an access attempt, to identify an index included in barring information corresponding to the access category, and to determine whether to bar the access attempt based on access control information indicated by the index.

Advantageous Effects of Invention

According to an embodiment of the disclosure, it is possible to improve a method for configuring configuration information for controlling the access of a UE, and it is also possible to improve a method for communication between a UE and a base station that transmit and receive such configuration information.

The disclosure proposes a method in which a core network of a next-generation mobile communication system sets the number of data radio bearers supportable by a UE and a wireless network, and configures an additional logical channel identifier in order to support the number of radio bearers supported by next-generation mobile communication even in an LTE wireless network when a situation an LTE base station is connected to the core network. Accordingly, it is possible to support an extended number of radio bearers even when the LTE wireless network is connected to the new radio (NR) core network.

BRIEF DESCRIPTION OF DRAWINGS

For a more complete understanding of the disclosure and its advantages, reference is now made to the following description taken in conjunction with the accompanying drawings, in which like reference numerals represent like parts:

FIG. 1A illustrates the structure of a next-generation mobile communication system;

FIG. 1B illustrates a process of controlling the access of a UE in a connected mode or in an inactive mode according to the disclosure;

FIG. 1C is a flowchart illustrating a process of controlling the access of a UE in a connected mode or in an inactive mode according to the disclosure;

FIG. 1D illustrates a method of configuring barring configuration information according to embodiment 1-1 of the disclosure;

FIG. 1E is a flowchart illustrating the operation of a UE selecting barring configuration information according to embodiment 1-1 of the disclosure;

FIG. 1F is a flowchart illustrating the operation of a base station configuring barring configuration information according to embodiment 1-1 of the disclosure;

FIG. 1G illustrates a method of configuring barring configuration information according to embodiment 1-2 of the disclosure;

FIG. 1H is a flowchart illustrating the operation of a UE selecting barring configuration information according to embodiment 1-2 of the disclosure;

FIG. 1I is a flowchart illustrating the operation of a base station configuring barring configuration information according to embodiment 1-2 of the disclosure;

FIG. 1J illustrates the internal structure of a UE according to the disclosure;

FIG. 1K is a block diagram illustrating the configuration of a base station according to the disclosure;

FIG. 2A illustrates the structure of an LTE system for reference to describe the disclosure;

FIG. 2B illustrates the structure of wireless protocols for an LTE system for reference to describe the disclosure;

FIG. 2C illustrates the structure of a next-generation mobile communication system to which the disclosure is applied;

FIG. 2D illustrates the structure of wireless protocols for a next-generation mobile communication system to which the disclosure is applied;

FIG. 2E illustrates UEs, network structures, and data radio bearers in LTE, eLTE, and NR according to the disclosure;

FIG. 2F-A illustrates a medium access control (MAC) sub-header structure in an LTE system according to the disclosure;

FIG. 2F-B illustrates an MAC sub-header structure in an LTE system according to the disclosure;

FIG. 2F-C illustrates an MAC sub-header structure in an LTE system according to the disclosure;

FIG. 2F-D illustrates an MAC sub-header structure in an LTE system according to the disclosure;

FIG. 2G-A illustrates an MAC sub-header structure having an extended LCID according to an embodiment of the disclosure;

FIG. 2G-B illustrates an MAC sub-header structure having an extended LCID according to an embodiment of the disclosure;

FIG. 2G-C illustrates an MAC sub-header structure having an extended LCID according to an embodiment of the disclosure;

FIG. 2G-D illustrates an MAC sub-header structure having an extended LCID according to an embodiment of the disclosure;

FIG. 2H-A illustrates another MAC sub-header structure having an extended LCID according to an embodiment of the disclosure;

FIG. 2H-B illustrates another MAC sub-header structure having an extended LCID according to an embodiment of the disclosure;

FIG. 2H-C illustrates another MAC sub-header structure having an extended LCID according to an embodiment of the disclosure;

FIG. 2H-D illustrates another MAC sub-header structure having an extended LCID according to an embodiment of the disclosure;

FIG. 2I-A illustrates still another MAC sub-header structure having an extended LCID according to an embodiment of the disclosure;

FIG. 2I-B illustrates still another MAC sub-header structure having an extended LCID according to an embodiment of the disclosure;

FIG. 2I-C illustrates still another MAC sub-header structure having an extended LCID according to an embodiment of the disclosure;

FIG. 2I-D illustrates still another MAC sub-header structure having an extended LCID according to an embodiment of the disclosure;

FIG. 2J illustrates the overall operation of a UE supporting an extended logical channel identifier according to an embodiment of the disclosure;

FIG. 2K illustrates the overall operation of a base station supporting an extended logical channel identifier according to an embodiment of the disclosure;

FIG. 2L is a block diagram illustrating the internal structure of a UE according to the disclosure; and FIG. 2M is a block diagram illustrating the configuration of a base station according to the disclosure.

MODE FOR THE INVENTION

Hereinafter, exemplary embodiments of the disclosure will be described in detail with reference to the accompanying drawings. Here, it is noted that identical reference numerals denote the same structural elements in the accompanying drawings. Further, a detailed description of a known function and configuration which may make the subject matter of the disclosure unclear will be omitted.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

Embodiment 1

When detailed descriptions about related known functions or configurations are determined to make the gist of the disclosure unclear in describing the disclosure, the detailed descriptions will be omitted herein. Hereinafter, embodiments of the disclosure will be described with reference to the accompanying drawings.

FIG. 1A illustrates the structure of a next-generation mobile communication system.

Referring to FIG. 1A, a radio access network of the next-generation mobile communication system (new radio: NR) includes a new radio Node B (hereinafter, "gNB") 1a-10 and an Access and Mobility Management Function (AMF) (new radio core network) 1a-05. A new radio user equipment (hereinafter, "NR UE" or "UE") 1a-15 accesses an external network through the gNB 1a-10 and the AMF 1a-05.

In FIG. 1A, the gNB corresponds to an evolved Node B (eNB) of an existing LTE system. The gNB is connected to the NR UE via a radio channel and may provide a superior service to the existing Node B (1a-20). In the next-generation mobile communication system, since all user traffic is served through a shared channel, a device that performs scheduling by collecting state information on UEs, such as a buffer state, an available transmission power state, and a channel state, is needed, and the gNB 1a-10 functions as this device. One gNB generally controls a plurality of cells. In order to realize ultrahigh-speed data transmission compared to the existing LTE, it is possible to additionally employ a beamforming technique that can provide an existing maximum bandwidth or greater using orthogonal frequency division multiplexing (hereinafter, "OFDM") as a radio access technology. In addition, an adaptive modulation and coding (hereinafter, "AMC") scheme that determines a modulation scheme and a channel coding rate according to the channel state of a UE is employed. The AMF 1a-05 performs functions, such as mobility support, bearer setup, and QoS setup.

The AMF is a device that performs various control functions in addition to a mobility management function for a UE, and is connected to a plurality of gNBs. Also, the next-generation mobile communication system may interwork with the existing LTE system, and the AMF is connected to Mobility Management Entity (MME) 1a-25 through a network interface. The MME is connected to an eNB 1a-30 which is an existing gNB. The UE supporting LTE-NR dual connectivity may transmit and receive data by maintaining connection not only to the gNB but also to the eNB (1a-35).

FIG. 1B illustrates a UE access control process according to the disclosure. The disclosure proposes a method of effectively providing barring configuration information based on an access identity and an access category. An access identity is indication information defined in the 3GPP, that is, specified in the specifications. The access identity is used to indicate a particular access as listed in Table 1. Generally, the access identity indicates accesses classified as access classes 11 to 15, a multimedia priority service (MPS), and a mission critical service (MCS). The access classes 11 to 15 indicate an operator-specific access or an access for public uses.

TABLE 1

| Access Identity number | UE configuration |
|---|---|
| 0 | UE is not configured with any parameters from this table |
| 1 (NOTE 1) | UE is configured for Multimedia Priority Service (MPS). |
| 2 (NOTE 2) | UE is configured for Mission Critical Service (MCS). |
| 3-10 | Reserved for future use |
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |
| 14 (NOTE 3) | Access Class 14 is configured in the UE, |
| 15 (NOTE 3) | Access Class 15 is configured in the UE. |

NOTE 1:
Access Identity 1 is used to provide overrides according to the subscription information in UEs configured for MPS. The subscription information defines whether an overide applies to UEs within one of the following categories:
a) UEs that are configured for MPS:
b) UEs that are configured for MPS and are in the PLMN listed as most preferred PLMN of the country where the UE is roaming in the operator-defined PLMN selector list or in their HPLMN or in a PLMN that is equivalent to their HPLMN;
c) UEs that are configured for MPS and are in their HPLMN or in a PLMN that is equivalent to it.
NOTE 2:
Access Identity 2 is used to provide overrides according to the subscription information in UEs configured for MCS. The subscription information defines whether an overide applies to UEs within one of the following categories:
a) UEs that are configured for MCS:
b) UEs that are configured for MCS and are in the PLMN listed as most preferred PLMN of the country where the UE is roaming in the operator-defined PLMN selector list or in their HPLMN or in a PLMN that is equivalent to their HPLMN;
c) UEs that are configured for MCS and are in their HPLMN or in a PLMN that is equivalent to it.
NOTE 3
Access Identities 11 and 15 are valid in Home PLMN only if the EHPLMN list is not present or in any EHPLMN. Access Identities 12, 13 and 14 are valid in Home PLMN and visited PLMNs of home country only. For this purpose the home country is defined as the country of the MCC part of the IMSI.

Access categories are divided into two types.

One type is a standardized access category. This category is a category defined in the RAN level, that is, specified in the specifications. Therefore, the same standardized access category is applied to different operators. In the disclosure, a category corresponding to an emergency is included in the standardized access category. All accesses correspond to at least one of the standardized access categories.

The other type is an operator-specific (non-standardized) access category. This category is defined outside the third Generation Partnership Project (3GPP) and is not specified in the specifications. Therefore, one operator-specific access category is differently meant for each operator. This category is the same in nature as a category in existing Application specific Congestion control for Data Communication (ACDC). An access triggered by a UE Non-Access Stratum (NAS) may not be mapped to an operator-specific access category. A significant difference between this access category and the category in the existing ACDC is that this access category may correspond to not only an application but also elements other than an application, such as a service type, a call type, a UE type, a user group, a signaling type, a slice type, or a combination of these elements. That is, this category may control whether to approve an access with respect to accesses belonging to different elements. This access category is used to indicate a particular access as in Table 2. Access categories 0 to 7 are used to indicate a standardized access category, and access categories 32 to 63 are used to indicate an operator-specific access category.

TABLE 2

| Access Category number | Conditions related to UE | Type of access attempt |
|---|---|---|
| 0 | All | MO signalling resulting from paging |
| 1 (NOTE 1) | UE is configured for delay tolerant service and subject to access control for Access Category 1, which is judged based on relation of UE's HPLMN and the selected PLMN. | All except for Emergency |
| 2 | All | Emergency |
| 3 | All except for the conditions in Access Category 1. | MO signalling resulting from other than paging |
| 4 | All except for the conditions in Access Category 1. | MMTEL voice |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories |
| 8-31 | | Reserved standardized Access Categories |
| 32-63 (NOTE 2) | All | Based on operator classification |

NOTE 1
The barring parameter for Access Category 1 is accompanied with information that define whether Access Category applies to UEs within one of the following categories:
a) UEs that are configured for delay tolerant service;
b) UEs that are configured for delay tolerant service and are neither in their HPLMN nor in a PLMN that is equivalent to it;
c) UEs that are configured for delay tolerant service and are neither in the PLMN listed as most preferred PLMN of the country where the UE is roaming in the operator-defined PLMN selector list on the SIM/USIM, nor in their HPLMN nor in a PLMN that is equivalent to their HPLMN.
NOTE 2
When there are an Access Category based on operator classification and a standardized Access Category to both of which an access attempt can be categorized, and the standardized Access Category is neither 0 nor 2, the UE applies the Access Category based on operator classification. When there are an Access Category based on operator classification and a standardized Access Category to both of which an access attempt can be categorized, and the standardized Access Category is 0 or 2. the UE applies the standardized Access Category.

An operator server 1b-25 provides a management object (MO) on operator-specific access category information to a UE NAS through NAS signaling or application-level data transmission. The MO indicates an element, such as an application, to which each operator-specific category corresponds. For example, it may be specified in the MO that access category 32 corresponds to an access corresponding to a Facebook application. A gNB 1b-20 provides UEs with a list of categories providing barring configuration information and barring configuration information corresponding to each category using system information. A UE 1b-05 includes logical blocks of an NAS 1b-10 and an Access Stratum (AS) 1b-15.

The UE NAS maps a triggered access to one or more access identities and one access category according to predetermined rules. This mapping operation is performed in all Radio Resource Control (RRC) states, that is, a connected mode (RRC_CONNECTED), an idle mode (RRC_IDLE), and an inactive mode (RRC_INACTIVE). The characteristics of each RRC state are listed below.

RRC_IDLE:
A UE specific Discontinuous Reception (DRX) may be configured by upper layers;
UE controlled mobility based on network configuration;
The UE:
Monitors a Paging channel;
Performs neighboring cell measurements and cell (re-) selection;
Acquires system information.
RRC_INACTIVE:
A UE specific DRX may be configured by upper layers or by RRC layer;
UE controlled mobility based on network configuration;
The UE stores the AS context;
The UE:
Monitors a Paging channel;
Performs neighboring cell measurements and cell (re-) selection;
Performs RAN-based notification area updates when moving outside the RAN-based notification area;
Acquires system information.
RRC_CONNECTED:
The UE stores the AS context.
Transfer of unicast data to/from UE.
At lower layers, the UE may be configured with a UE specific DRX;
For UEs supporting CA, use of one or more SCells, aggregated with the SpCell, for increased bandwidth;
For UEs supporting dual connectivity (DC), use of one Secondary Cell Group (SCG), aggregated with the Master Cell Group (MCG), for increased bandwidth;
Network controlled mobility, i.e., handover within NR and to/from Evolved Universal Terrestrial Access Network (E-UTRAN).
The UE:
Monitors a paging channel;
Monitors control channels associated with the shared data channel to determine if data is scheduled for it;
Provides channel quality and feedback information;
Performs neighboring cell measurements and measurement reporting;
Acquires system information.

According to another option, in access category mapping, if one access can be mapped to one standardized access category, the access may be further mapped to one operator-specific access category. The UE NAS transmits the mapped access identity and the mapped access category along with a service request to the UE AS.

If the UE AS is provided with information about the access identity or access category together with a message received from the UE NAS in all RRC states, the UE AS performs a barring check operation to determine whether wireless connection is allowed before performing wireless connection caused by the message. As a result of the barring check operation, if wireless connection is allowed, the UE AS transmits an RRC connection establishment request to a network. For example, the NAS of the UE in the connected mode or the inactive mode transmits the access identity and the access category to the UE AS for the following reasons (1b-30). In the disclosure, the following reasons are collectively referred to as a "new session request":
new multimedia telephony service (MMTEL) voice or video session
sending of short message service (SMS) (SMS over IP, or SMS over NAS)
new Protocol Data Unit (PDU) session establishment
existing PDU session modification
service request to re-establish the user plane for an existing PDU session.

However, the NAS of the UE in the idle mode transmits the access identity and the access category to the UE AS when making the service request.

The UE AS determines whether the access triggered by the UE NAS is allowed using the barring configuration information (barring check).

An operator may want to allow only a particular service type among accesses corresponding to at least one of access classes 11 to 15. Thus, in the disclosure, it is determined whether to allow accesses belonging to access classes 11, 12, 13, 14, 15, which are indicated by an access identity, according to attributes distinguished by an access category. To this end, a method of configuring barring configuration information of an access identity or an access category is proposed. In the disclosure, it is assumed that the barring configuration information of the access category includes ac-barringFactor and ac-barringTime as barring configuration information of existing Access Class Barring (ACB) pr ACDC.

FIG. 1C is a flowchart illustrating an access control process according to the disclosure.

A UE 1c-05 includes an NAS 1c-10 and an AS 1c-15. The NAS is responsible for processes that are not directly associated with wireless connection, that is, authentication, service request, and session management, while the AS is responsible for processes associated with wireless connection. A network provides an MO to the NAS using an Operations and Management (OAM) message (application-level data message) or NAS message (1c-25). The MO indicates an element, such as an application, to which each operator-specific category corresponds.

The NAS uses the MO to determine an operator-specific category to which a triggered access is mapped. The triggered access may be a new MMTEL service (voice call or video call), SMS transmission, new PDU session establishment, a change of an existing PDU session, or the like. When a service is triggered, the NAS maps the service to an access identity and an access category corresponding to an attribute of the service (1c-30).

The service may not be mapped to any access identity or may be mapped to one or more access identities. Also, the service may be mapped to one access category. Assuming that the service can be mapped to one access category, the NAS first checks whether the service is mapped to an operator-specific access category provided by the MO. If the service is not mapped to any operator-specific access category, the NAS may identify an access category corresponding to the service among the standardized access categories. Assuming that the service can be mapped to a plurality of access categories, the NAS may map one service to one operator-specific access category and one standardized access category. However, if the service is not mapped to any operator-specific access category, the service may correspond to one of the standardized access categories. In the mapping rules, an emergency service may be an exception.

The NAS transmits a new session request or a service request to the AS along with the mapped access identity and access category (1c-40). The NAS transmits the new session request in the connected mode or the inactive mode, and transmits the service request in the idle mode.

The AS receives barring configuration information via system information broadcasted by the network (1c-35). An Abstract Syntax Notation One (ASN.1) structure of the barring configuration information is shown in Table 3, and a detailed description thereof will be described later.

First, each of bits in uac-BarringForAccessIdentityList corresponds to one access identity, and if this bit is 0, an access associated with the access identity is allowed. If at least one of bits in uac-BarringForAccessIdentityList corresponding to at least one of the mapped access identities is 0, the access is allowed. If any one of bits in uac-BarringForAccessIdentityList corresponding to at least one of the mapped access identities is not 0, an additional barring check is performed further using the uac-BarringForAccessIdentityList, which will be described later. The range of uac-BarringFactor $\alpha$ satisfies $0 \leq \alpha < 1$. The UE AS derives one random value, rand, which satisfies $0 \leq rand < 1$. If the random value is less than uac-BarringFactor, it is considered that the access is not barred. Otherwise, it is considered that the access is barred. When it is determined that the access is

TABLE 3

```
SIBX ::= SEQUENCE {
★★★★★★★★★★★★★★★★★★★★★★★★★★★★ Start of change ★★★★★★★★★★★★★★★★★★★★★★★★★★★★
    uac-BarringForCommon                            UAC-BarringForCommon
        -- FFS: Need for parameters common to PLMNs
    uac-BarringPerPLMN-List                         UAC-BarringPerPLMN-List
    UAC-BarringForCommon ::=                        SEQUENCE {
        barringPerCatList                               BarringPerCatList
                                                    }
    UAC-BarringPerPLMN-List ::=                     SEQUENCE (SIZE (1.. maxPLMN)) OF UAC-BarringPerPLMN
        -- maxPLMN = 12
    UAC-BarringPerPLMN ::=                          SEQUENCE {
        plmn-IdentityIndex                              INTEGER (1..maxPLMN),
        barringPerCatList                                   BarringPerCatList
                                                    }
    BarringPerCatList ::= SEQUENCE (SIZE (1..maxAccessCat-1)) OF BarringPerCat
        -- maxAccessCat = 64
    BarringPerCat ::= SEQUENCE {
        AccessCategory                              INTEGER (1..maxAccessCat),
        uac-BarringInfo                             SEQUENCE {
            uac-BarringFactor                           ENUMERATED {
                                                            p00, p05, p10, p15, p20, p25, p30, p40,
                                                            p50, p60, p70, p75, p80, p85, p90, p95},
            -- FFS: parameter values
            uac-BarringTime                             ENUMERATED {s4, s8, s16, s32, s64, s128, s256, s512}
            -- FFS: parameter values
            uac-BarringForAccessIdentitylist                        BIT STRING (SIZE(7))
            -- maxAccessIdentity = 7
            -- Corresponds to access identities 1,2, 11-15 (MPS, MCS and AC11-15)
            -- Value 0 indicates that access attempt is allowed for the corresponding access identity
        }
}
★★★★★★★★★★★★★★★★★★★★★★★★★★★★ End of change ★★★★★★★★★★★★★★★★★★★★★★★★★★★★
```

The AS determines whether the service request is allowed using information about the access identity and the access category mapped by the NAS and the barring configuration information received from the network (1c-45). In the disclosure, the operation of determining whether the service request is allowed is referred to as a barring check.

A UE receives the system information including the barring configuration information and stores the configuration information. The barring configuration information is provided per public land mobile network (PLMN) and access category. A BarringPerCatList information element (IE) is used to provide barring configuration information of access categories belonging to one PLMN. To this end, a PLMN ID and barring configuration information of each of the access categories are included in the IE in the form of a list. The barring configuration information of each access category may include an access category ID (or index) indicating a particular access category, a uac-BarringForAccessIdentityList field, a uac-BarringFactor field, and a uac-Barringtime field.

The barring check operation is performed as follows.

barred, the UE AS delays an access attempt for a time derived using the following equation.

$$\text{"}Tbarring\text{"}=(0.7+0.6*rand)*uac\text{-}Barring\ Time. \quad \text{Equation 1}$$

According to predetermined rules, when the service request is allowed, the AS transmits an RRC connection establishment or RRC connection resume request or data associated with a new session to the network (1c-50).

Generally, the size of the uac-BarringForAccessIdentityList field, the uac-BarringFactor field, and the uac-Barringtime field provided per access category is a total of about 20 bits. Pieces of barring configuration information of up to 63 access categories may be provided every up to PLMNs through the system information. Therefore, the total size of the barring configuration information is 20×12×63=125,120 bits. Although the maximum size of information may actually change to a certain degree in standard technologies, such approximate information amount is not negligible, even allowing for a change in information size.

The disclosure proposes a method of optimizing the size of barring configuration information and transmitting the optimized barring configuration information to UEs. In embodiment 1-1, when pieces of barring configuration information of a plurality of access categories are the same, pieces of configuration information of access categories other than configuration information of one access category include only an access category ID and a particular indicator. In embodiment 1-2, if an entry corresponding to a particular access category is not included in uac-BarringForAccessIdentityList, a barring check for the access category is performed using barring configuration information of an access category included in the last entry of uac-BarringForAccessIdentityList.

Embodiment 1-1

FIG. 1D illustrates a method of configuring barring configuration information according to embodiment 1-1 of the disclosure.

A gNB provides barring configuration information to UEs in a service area using particular system information block type (SIB) x. The barring configuration information may be provided per PLMN. If the same barring configuration information is applied to all PLMNs, common barring configuration information for a PLMN may be provided instead of providing the barring configuration information for each PLMN.

The barring configuration information for each PLMN is provided via a UAC-BarringPerPLMN IE. The UAC-BarringPerPLMN IE includes a plmn-IdentityIndex field, which is PLMN index information, to indicate which PLMN the IE is for. Further, the UAC-BarringPerPLMN IE includes a BarringPerCatList IE, which is barring configuration information that UEs belonging to the PLMN need to apply. In the disclosure, if the UAC-BarringPerPLMN IE includes only a plmn-IdentityIndex value, it is considered that accesses corresponding to all access categories triggered by a UE of which the PLMN indicated by the plmn-IdentityIndex is a Registered PLMN (RPLMN) are allowed.

The BarringPerCatList IE includes barring configuration information per access category in the form of a list. Each entry, that is, a BarringPerCat IE, in the list corresponds to one access category. The BarringPerCat IE includes access category ID information, barring configuration information applied to an access category, and a uac-BarringInfo IE. According to the disclosure, if the BarringPerCat IE includes only the access category ID information, it is considered that an access corresponding to an access category corresponding to the access category ID information is allowed. That is, the uac-BarringInfo IE is not always provided but is optional. The uac-BarringInfo IE includes a uac-BarringForAccessIdentityList field, a uac-BarringFactor field, and a uac-Barringtime field. A method of applying these pieces of information to a barring check operation has been described above.

In the disclosure, access categories to which the same uac-BarringInfo information is applied are positioned in adjacent entries in the BarringPerCatList IE. In addition, barring configuration information of the access categories to which the same uac-BarringInfo information is applied may be provided in only one entry of the adjacent entries. Therefore, entries not including the barring configuration information may include a one-bit indicator to indicate the barring configuration information. Applying the same uac-BarringInfo information means that the same values of the uac-BarringForAccessIdentityList field, the uac-BarringFactor field, and the uac-Barringtime field in the IE are applied. For example, if three access categories have the same uac-BarringInfo information, the access categories may be positioned in adjacent entries. Here, only BarringPerCat included in an entry at a particular position includes a uac-BarringInfo IE. The remaining BarringPerCat does not include the uac-BarringInfo IE but includes a one-bit indicator to indicate the use of the uac-BarringInfo IE included in the entry at the particular position.

The particular position refers to the first or last entry among the adjacent entries to which the same uac-BarringInfo information is applied. For example, assuming that uac-BarringInfo is present in the first entry among the adjacent entries to which the same uac-BarringInfo information is applied, an entry, a BarringPerCat IE, corresponding to an access category mapped to an access triggered by the UE includes the one-bit indicator, it is identified whether uac-BarringInfo is present in the previous entry. If present, the configuration information is used for a barring check. If the previous entry includes the one-bit indicator instead of uac-BarringInfo, the entry before the previous entry is checked. This operation is repeated until uac-BarringInfo is found in the previous entries. On the contrary, assuming that uac-BarringInfo is present in the last entry among the adjacent entries to which the same uac-BarringInfo information is applied, if an entry, that is, a BarringPerCat IE, corresponding to an access category mapped to an access triggered by the UE includes the one-bit indicator, it is identified whether uac-BarringInfo is present in the next entry. If uac-BarringInfo is present, the UE uses the configuration information for a barring check. If the next entry includes the one-bit indicator instead of uac-BarringInfo, the UE checks the entry after the next entry. This operation is repeated until uac-BarringInfo is found in the next entries.

Even when the same uac-BarringInfo information is applied, each BarringPerCat IE needs to include an access category ID.

If the same configuration information is considered in the disclosure, the uac-BarringFactor field and the uac-Barringtime field of the uac-BarringInfo IE may be considered, and the uac-BarringForAccessIdentityList field may be excluded. In this case, the one-bit indicator indicates that barring values of the previous or next entry refer to the values of the uac-BarringFactor field and the uac-Barringtime field of the uac-BarringInfo IE, in which case the BarringPerCat IE includes an access category ID, a uac-BarringForAccessIdentityList, and a one-bit indicator. If it is considered that the access is allowed from the uac-BarringForAccessIdentityList information, a connection establishment operation is immediately performed without checking the barring values of the previous or next entry.

FIG. 1E is a flowchart illustrating the operation of a UE selecting barring configuration information according to embodiment 1-1 of the disclosure.

In operation 1e-05, the UE receives system information including barring configuration information.

In operation 1e-10, the UE stores the configuration information. The configuration information may be configured separately per PLMN and access category.

In operation 1e-15, the UE identifies a mapped access category corresponding to an access attempt from a UE NAS. For a particular access, such as an RNA update, the access category may be mapped in the RRC.

In operation 1e-20, the UE identifies an entry corresponding to the access category (barring information per category, that is, a BarringPerCat IE) from the stored configuration information.

In operation 1e-25, if the stored configuration information includes no entry corresponding to the access category, the UE considers that an access corresponding to the access category is allowed.

In operation 1e-30, if the stored configuration information includes the entry corresponding to the access category and includes uac-BarringInfo information (or barring information), the UE performs a barring check operation using the information.

In operation 1e-35, if the stored configuration information includes the entry corresponding to the access category and includes a one-bit indicator instead of the uac-BarringInfo information, the UE identifies the uac-BarringInfo information that occurs first in the previous entries.

In operation 1e-40, the UE performs a barring check operation using the identified uac-BarringInfo information.

In operation 1e-45, if the access is not barred by the barring check operation, the UE performs connection establishment (connection mode switch).

In operation 1e-50, if the access is barred by the barring check operation, the UE notifies the UE NAS that the access is barred.

FIG. 1F is a flowchart illustrating the operation of a gNB configuring barring configuration information according to embodiment 1-1 of the disclosure.

In operation 1f-05, the gNB includes an access category ID and barring configuration information, which is a uac-BarringInfo IE, in each entry of a BarringPerCatList IE. Each entry corresponds to one access category indicated by the access category ID.

In operation 1f-10, the gNB includes entries having the same uac-BarringInfo to be adjacently positioned in BarringPerCatList.

The gNB includes uac-BarringInfo in one entry. The gNB includes one indicator, instead of the uac-BarringInfo IE, in entries except for the one entry among the plurality of adjacent entries. In operation 1f-15, the gNB includes only the access category ID in an entry corresponding to an access category corresponding to an access allowed without a barring check and does not include uac-BarringInfo and the indicator in the entry.

In operation 1f-20, the gNB includes the configured BarringPerCatList in system information.

In operation 1f-25, the gNB broadcasts the system information.

Embodiment 1-2

FIG. 1G illustrates a method of configuring barring configuration information according to embodiment 1-2 of the disclosure.

A gNB provides barring configuration information to UEs in a service area using particular system information (SIB x). The barring configuration information may be provided per PLMN. If the same barring configuration information is applied to all PLMNs, common barring configuration information for a PLMN may be provided instead of providing the barring configuration information for each PLMN.

The barring configuration information for each PLMN is provided via a UAC-BarringPerPLMN IE. The UAC-BarringPerPLMN IE includes a plmn-IdentityIndex field, which is PLMN index information, to indicate which PLMN the IE is for. Further, the UAC-BarringPerPLMN IE includes a BarringPerCatList IE, which is barring configuration information that UEs belonging to the PLMN need to apply. In the disclosure, if the UAC-BarringPerPLMN IE includes only a plmn-IdentityIndex value, it is considered that accesses corresponding to all access categories triggered by a UE of which the PLMN indicated by the plmn-IdentityIndex is an RPLMN are allowed.

The BarringPerCatList IE includes barring configuration information per access category in the form of a list. Each entry, that is, a BarringPerCat IE, in the list corresponds to one access category. The BarringPerCat IE includes access category ID information, barring configuration information applied to an access category, and a uac-BarringInfo IE. According to the disclosure, if the BarringPerCat IE includes only the access category ID information, it is considered that an access corresponding to an access category corresponding to the access category ID information is allowed without a barring check. That is, the uac-BarringInfo IE is not always provided but is optional. The uac-BarringInfo IE includes a uac-BarringForAccessIdentityList field, a uac-BarringFactor field, and a uac-Barringtime field. A method of applying these pieces of information to a barring check operation has been described above.

In the disclosure, pieces of barring configuration information corresponding to the respective access categories are included in the BarringPerCatList IE in ascending order of barring values. A higher barring value means a lower probability that an access is allowed. Alternatively, a higher barring value means a longer stochastic time to wait for an access reattempt if an access is barred by a barring check operation. That is, it is considered that the smaller a uac-BarringFactor value is and the larger a uac-BarringTime value is in uac-BarringInfo, the greater a barring value is.

For example, when the pieces of barring configuration information corresponding to the respective access categories are included in the BarringPerCatList IE, the pieces of barring configuration information may be included in descending order of uac-BarringFactor values or in ascending order of uac-BarringTime values. Therefore, an access corresponding to an access category involved in the second entry is more likely to be allowed than an access corresponding to an access category involved in the third entry. Further, in the disclosure, there may be no entry corresponding to a particular access category in BarringPerCatList in which case a barring check operation for the particular access category is performed using uac-BarringInfo information of the last entry included in BarringPerCatList.

FIG. 1H is a flowchart illustrating the operation of a UE selecting barring configuration information according to embodiment 1-1 of the disclosure.

In operation 1h-05, the UE receives system information including barring configuration information.

In operation 1h-10, the UE stores the configuration information. The configuration information may be configured separately per PLMN and access category.

In operation 1h-15, the UE identifies an access category corresponding to an access attempt from a UE NAS. For a particular access, such as an RAN-based Notification Area (RNA) update, the access category may be identified in the RRC.

In operation 1h-20, the UE identifies an entry corresponding to the access category from the stored configuration information.

In operation 1h-25, if the stored configuration information includes no entry corresponding to the access category, the UE considers that an access corresponding to the access category is allowed.

In operation 1h-30, if the stored configuration information includes the entry corresponding to the access category and includes uac-BarringInfo information, the UE performs a barring check operation using the information.

In operation 1h-35, if the entry corresponding to the access category is not included in BarringPerCatList, the UE performs a barring check operation using the uac-BarringInfo information of the last entry included in BarringPerCatList.

In operation 1h-40, if the access is not barred by the barring check operation, the UE performs connection establishment (connection mode switch).

In operation 1h-45, if the access is barred by the barring check operation, the UE notifies the UE NAS that the access is barred.

FIG. 1I is a flowchart illustrating the operation of a gNB configuring barring configuration information according to embodiment 1-2 of the disclosure.

In operation 1i-05, the gNB includes an access category ID corresponding to one access category and barring configuration information, which is a uac-BarringInfo IE, in each entry of a BarringPerCatList IE according to a preset order. Each entry corresponds to one access category indicated by the access category ID. The preset order is the descending order or ascending order of uac-BarringFactor or uac-BarringTime values to be applied to each access category. When the order is determined, entries corresponding to respective access categories are included in the BarringPerCatList IE.

In operation 1i-10, if there is a plurality of access categories that can be included in the last entry of BarringPerCatList, the gNB includes only information corresponding to one of the access categories and does not include the access categories.

In operation 1i-15, the gNB includes only the access category ID in an entry corresponding to an access category corresponding to an access allowed without a barring check and does not include uac-BarringInfo and the indicator in the entry.

In operation 1i-20, the gNB includes the configured BarringPerCatList in system information.

In operation 1i-25, the gNB broadcasts the system information.

The methods proposed in embodiments 1-1 and 1-2 may be applied together.

FIG. 1J illustrates the structure of a UE according to the disclosure.

Referring to FIG. 1J, the UE includes a radio frequency (RF) processor 1j-10, a baseband processor 1j-20, a memory 1j-30, and a controller 1j-40.

The RF processor 1j-10 performs a function for transmitting or receiving a signal through a wireless channel, such as band conversion and amplification of a signal. That is, the RF processor 1j-10 upconverts a baseband signal, provided from the baseband processor 1j-20, into an RF band signal to transmit the RF band signal through an antenna and downconverts an RF band signal, received through the antenna, into a baseband signal. For example, the RF processor 1j-10 may include a transmission filter, a reception filter, an amplifier, a mixer, an oscillator, a digital-to-analog converter (DAC), and an analog-to-digital converter (ADC). Although FIG. 1J shows only one antenna, the UE may include a plurality of antennas. In addition, the RF processor 1j-10 may include a plurality of RF chains. Further, the RF processor 1j-10 may perform beamforming. For beamforming, the RF processor 1j-10 may adjust the phase and strength of each of signals transmitted and received through a plurality of antennas or antenna elements. The RF processor may perform MIMO and may receive a plurality of layers when performing MIMO.

The baseband processor 1j-20 performs a function of converting a baseband signal and a bit stream according to the physical-layer specification of a system. For example, in data transmission, the baseband processor 1j-20 encodes and modulates a transmission bit stream, thereby generating complex symbols. In data reception, the baseband processor 1j-20 demodulates and decodes a baseband signal, provided from the RF processor 1j-10, thereby reconstructing a reception bit stream. For example, according to OFDM, in data transmission, the baseband processor 1j-20 generates complex symbols by encoding and modulating a transmission bit stream, maps the complex symbols to subcarriers, and constructs OFDM symbols through an inverse fast Fourier transform (IFFT) and cyclic prefix (CP) insertion. In data reception, the baseband processor 1j-20 divides a baseband signal, provided from the RF processor 1j-10, into OFDM symbols, reconstructs signals mapped to subcarriers through a fast Fourier transform (FFT), and reconstructs a reception bit stream through demodulation and decoding.

As described above, the baseband processor 1j-20 and the RF processor 1j-10 transmit and receive signals. Accordingly, the baseband processor 1j-20 and the RF processor 1j-10 may be referred to as a transmitter, a receiver, a transceiver, or a communication unit. At least one of the baseband processor 1j-20 and the RF processor 1j-10 may include a plurality of communication modules to support a plurality of different radio access technologies. Further, at least one of the baseband processor 1j-20 and the RF processor 1j-10 may include different communication modules for processing signals in different frequency bands. For example, the different radio access technologies may include a wireless local area network (LAN) (for example, IEEE 802.11), a cellular network (for example, an LTE network), and the like. In addition, the different frequency bands may include a super high frequency (SHF) band (for example, 2.NRHz) and a millimeter wave band (for example, 60 GHz).

The memory 1j-30 stores data, such as a default program, an application, and configuration information for operating the UE. In particular, the memory 1j-30 may store information on a second access node performing wireless communication using a second radio access technology. The memory 1j-30 provides stored data upon request from the controller 1j-40.

The controller 1j-40 controls overall operations of the UE. For example, the controller 1j-40 transmits and receives signals through the baseband processor 1j-20 and the RF processor 1j-10. Further, the controller 1j-40 records and reads data in the memory 1j-30. To this end, the controller 1j-40 may include at least one processor. For example, the controller 1j-40 may include a communication processor (CP) to perform control for communication and an application processor (AP) to control an upper layer, such as an application.

FIG. 1K is a block diagram illustrating the configuration of a gNB according to the disclosure.

Referring to FIG. 1K, the gNB includes an RF processor 1k-10, a baseband processor 1k-20, a backhaul transceiver 1k-30, a memory 1k-40, and a controller 1k-50.

The RF processor 1k-10 performs a function for transmitting or receiving a signal through a wireless channel, such as band conversion and amplification of a signal. That is, the RF processor 1k-10 upconverts a baseband signal, provided from the baseband processor 1k-20, into an RF band signal to transmit the RF band signal through an antenna and downconverts an RF band signal, received through the antenna, into a baseband signal. For example, the RF processor 1k-10 may include a transmission filter, a reception filter, an amplifier, a mixer, an oscillator, a DAC, and an ADC. Although FIG. 1Q shows only one antenna, the gNB may include a plurality of antennas. In addition, the RF processor 1k-10 may include a plurality of RF chains. Further, the RF processor 1k-10 may perform beamforming. For beamforming, the RF processor 1k-10 may adjust the phase and strength of each of signals transmitted and received through a plurality of antennas or antenna elements. The RF processor may transmit one or more layers, thereby performing downlink MIMO.

The baseband processor 1k-20 performs a function of converting a baseband signal and a bit stream according to the physical-layer specification of a first radio access technology. For example, in data transmission, the baseband processor 1k-20 encodes and modulates a transmission bit stream, thereby generating complex symbols. In data reception, the baseband processor 1k-20 demodulates and decodes a baseband signal, provided from the RF processor 1k-10, thereby reconstructing a reception bit stream. For example, according to OFDM, in data transmission, the baseband processor 1k-20 generates complex symbols by encoding and modulating a transmission bit stream, maps the complex symbols to subcarriers, and constructs OFDM symbols through an IFFT and CP insertion. In data reception, the baseband processor 1k-20 divides a baseband signal, provided from the RF processor 1k-10, into OFDM symbols, reconstructs signals mapped to subcarriers through an FFT, and reconstructs a reception bit stream through demodulation and decoding. As described above, the baseband processor 1k-20 and the RF processor 1k-10 transmit and receive signals. Accordingly, the baseband processor 1k-20 and the RF processor 1k-10 may be referred to as a transmitter, a receiver, a transceiver, a communication unit, or a wireless communication unit.

The backhaul transceiver 1k-30 provides an interface for performing communication with other nodes in a network. That is, the backhaul transceiver 1k-30 converts a bit stream, transmitted from the main gNB to another node, for example, a secondary gNB or a core network, into a physical signal and converts a physical signal, received from the other node, into a bit stream.

The memory 1k-40 stores data, such as a default program, an application, and configuration information for operating the main gNB. In particular, the memory 1k-40 may store information on a bearer allocated to a connected UE, a measurement result reported from a connected UE, and the like. In addition, the memory 1k-40 may store information as a criterion for determining whether to provide or stop a multi-connection to a UE. The memory 1k-40 provides stored data upon request from the controller 1k-50.

The controller 1k-50 controls overall operations of the main gNB. For example, the controller 1k-50 transmits and receives signals through the baseband processor 1k-20 and the RF processor 1k-10 or through the backhaul transceiver 1k-30. Further, the controller 1k-50 records and reads data in the memory 1k-40. To this end, the controller 1k-50 may include at least one processor.

Embodiment 2

FIG. 2A illustrates the structure of an LTE system for reference to describe the disclosure.

Referring to FIG. 2A, a radio access network of the LTE system includes evolved Nodes B (hereinafter, "eNBs", "Nodes B", or "base stations") 2a-05, 2a-10, 2a-15, and 2a-20, a mobility management entity (MME) 2a-25, and a serving-gateway (S-GW) 2a-30. A user equipment (hereinafter, "UE" or "terminal") 2a-35 is connected to an external network through the eNBs 2a-05, 2a-10, 2a-15, and 2a-20 and the S-GW 2a-30.

In FIG. 2A, the eNBs 2a-05 to 2a-20 correspond to existing Nodes B of a Universal Mobile Telecommunications System (UMTS) system. An eNB is connected to the UE 2a-35 via a radio channel and performs more complicate functions than the existing Nodes B. In the LTE system, since all user traffic including real-time services, such as voice over IP (VoIP) services, is served through a shared channel, a device that performs scheduling by collecting state information on UEs, such as a buffer state, an available transmission power state, and a channel state, is needed, and the eNBs 2a-05 to 2a-20 function as this device. One eNB generally controls a plurality of cells. In order to realize a transmission speed of 100 Mbps, the LTE system employs OFDM as a radio access technology in a 20 MHz bandwidth. In addition, the LTE system employs an AMC scheme that determines a modulation scheme and a channel coding rate according to the channel state of a UE.

The S-GW 2a-30 is a device that provides a data bearer, and generates or eliminates a data bearer under the control of the MME 2a-25. The MME is a device that performs various control functions in addition to a mobility management function for a UE, and is connected to a plurality of eNBs.

FIG. 2B illustrates the structure of wireless protocols for an LTE system for reference to describe the disclosure.

Referring to FIG. 2B, the wireless protocols for the LTE system include a packet data convergence protocol (PDCP) 2b-05 and 2b-40, a radio link control (RLC) 2b-10 and 2b-35, and a medium access control (MAC) 2b-15 and 2b-30 for each of a UE and an eNB. The PDCP 2b-05 and 2b-40 is responsible for IP header compression/decompression operations. Main functions of the PDCP are summarized as below.

Header compression and decompression: Robust Header Compression (ROHC) only
Transfer of user data
In-sequence delivery of upper layer PDUs at PDCP re-establishment procedure for RLC Acknowledge Mode (AM)
For split bearers in DC (only support for RLC AM): PDCP PDU routing for transmission and PDCP PDU reordering for reception
Duplicate detection of lower layer Service Data Units (SDUs) at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink The RLC 2b-10 and 2b-35 reconfigures a PDCP packet data unit (PDU) into an appropriate size and performs an Automatic Repeat Request (ARQ) operation. Main functions of the RLC are summarized as below.

Transfer of upper layer PDUs
Error correction through ARQ (only for AM data transfer)
Concatenation, segmentation, and reassembly of RLC SDUs (only for UM and AM data transfer)
Re-segmentation of RLC data PDUs (only for AM data transfer)
Reordering of RLC data PDUs (only for UM and AM data transfer)

Duplicate detection (only for Un-Acknowledged Mode (UM) and AM data transfer)
Protocol error detection (only for AM data transfer)
RLC SDU discard (only for UM and AM data transfer)
RLC re-establishment The MAC 2b-15 and 2b-30 is connected to a plurality of RLC layer devices configured in one UE, multiplexes RLC PDUs to an MAC PDU, and demultiplexes RLC PDUs from an MAC PDU. Main functions of the MAC are summarized as below.

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through Hybrid Automatic Repeat Request (HARQ)
Priority handling between logical channels of one UE
Priority handling between UEs by means of dynamic scheduling
MBMS service identification
Transport format selection
Padding A physical layer 2b-20 and 2b-25 performs channel coding and modulation of upper-layer data into OFDM symbols to thereby transmit the OFDM symbols via a radio channel or performs demodulation and channel decoding of OFDM symbols received through a radio channel to thereby transmit the OFDM symbols to an upper layer. The physical layer also uses hybrid ARQ (HARQ) for additional error correction, in which a reception terminal transmits one bit to indicate whether a packet transmitted from a transmission terminal is received. This is referred to as HARQ ACK/NACK information. Downlink HARQ ACK/NACK information in response to uplink transmission may be transmitted through a physical channel, such as a physical hybrid-ARQ indicator channel (PHICH), and uplink HARQ ACK/NACK information in response to downlink transmission may be transmitted through a physical channel, such as a physical uplink control channel (PUCCH) or physical uplink shared channel (PUSCH).

The physical layer may include one frequency/carrier or a plurality of frequencies/carriers, and a technology of simultaneously configuring and using a plurality of frequencies is referred to as carrier aggregation (hereinafter, "CA"). In CA, instead of using one carrier, a main carrier and one additional subcarrier or a plurality of additional subcarriers are used for communication between a terminal (or UE) and a base station (E-UTRAN NodeB: eNB), thereby dramatically increasing the transmission amount as much as the number of subcarriers. In LTE, a cell of a base station using a main carrier is referred to as a primary cell (PCell), and a cell using a subcarrier is referred to as a secondary cell (SCell).

Although not shown in the drawing, a radio resource control (hereinafter, "RRC") layer exists above the PDCP layer of each of the UE and the base station. The RRC layer may transmit and receive connection and measurement-related setup control messages for radio resource control.

FIG. 2C illustrates the structure of a next-generation mobile communication system to which the disclosure is applied.

Referring to FIG. 2C, a radio access network of the next-generation mobile communication system includes a new radio Node B (hereinafter, "NR NB") 2c-10 and a new radio core network (NR CN or next-generation core network (NG CN)) 2c-05. A new radio user equipment (hereinafter, "NR UE" or "UE") 2c-15 accesses an external network through the NR NB 2c-10 and the NR CN 2c-05.

In FIG. 2C, the NR NB 2c-10 corresponds to an evolved Node B (eNB) of an existing LTE system. The NR NB is connected to the NR UE 2c-15 via a radio channel and may provide a superior service to the existing Node B. In the next-generation mobile communication system, since all user traffic is served through a shared channel, a device that performs scheduling by collecting state information on UEs, such as a buffer state, an available transmission power state, and a channel state, is needed, and the NR NB 2c-10 function as this device. One NR NB generally controls a plurality of cells. In order to realize ultrahigh-speed data transmission compared to the existing LTE, it is possible to additionally employ a beamforming technique that can provide an existing maximum bandwidth or greater using OFDM as a radio access technology. In addition, an AMC scheme that determines a modulation scheme and a channel coding rate according to the channel state of a UE is employed. The NR CN 2c-05 performs functions, such as mobility support, bearer setup, and QoS setup. The NR CN is a device that performs various control functions in addition to a mobility management function for a UE, and is connected to a plurality of base stations. Also, the next-generation mobile communication system may interwork with the existing LTE system, and the NR CN is connected to an MME 2c-25 through a network interface. The MME is connected to an eNB 2c-30 which is an existing base station.

FIG. 2D illustrates the structure of wireless protocols for a next-generation mobile communication system to which the disclosure is applied.

Referring to FIG. 2D, the wireless protocols for the next-generation mobile communication system include an NR PDCP 2d-05 and 2d-40, an NR RLC 2d-10 and 2d-35, and an NR MAC 2d-15 and 2d-30 for each of a UE and an NR NB. Main functions of the NR PDCP 2d-05 and 2d-40 may include some of the following functions.

Header compression and decompression: ROHC only
Transfer of user data
In-sequence delivery of upper layer PDUs
PDCP PDU reordering for reception
Duplicate detection of lower layer SDUs
Retransmission of PDCP SDUs
Ciphering and deciphering
Timer-based SDU discard in uplink The reordering function of the NR PDCP device refers to a function of reordering PDCP PDUs received from a lower layer in order according to the PDCP sequence number (SN), and may include a function of delivering data to an upper layer in reordering order, a function of recording lost PDCP PDUs by reordering, a function of reporting the state of the lost PDCP PDUs to a transmitter, and a function of requesting retransmission of the lost PDCP PDUs.

Main functions of the RLC 2d-10 and 2d-35 may include some of the following functions.

Transfer of upper layer PDUs
In-sequence delivery of upper layer PDUs
Out-of-sequence delivery of upper layer PDUs
Error correction through ARQ
Concatenation, segmentation and reassembly of RLC SDUs
Re-segmentation of RLC data PDUs
Reordering of RLC data PDUs
Duplicate detection
Protocol error detection
RLC SDU discard RLC re-establishment The in-sequence delivery function of the NR RLC device refers to a function of delivering RLC SDUs received from a lower layer to an upper layer in order, and may include a function of reassembling and delivering separate RLC SDUs if receiving a plurality of separate RLC SDUs into which one original RLC SDU is divided, a function of reordering received RLC PDUs according to the RLC SN or the PDCP SN, a function of recording lost RLC PDUs by reordering, a function of reporting the state of the lost RLC PDUs to a transmitter, a function of requesting retransmission of the lost RLC PDUs, a function of delivering only RLC SDUs before a lost RLC SDU to an upper layer in order in the occurrence of the lost RLC SDU, a function of delivering all RLC SDUs received before a timer starts to an upper layer in order if there is a lost RLC SDU but the timer expires, or a function of delivering all RLC SDUs received hitherto to an upper layer in order if there is a lost RLC SDU but the timer expires. Further, the NR RLC device may process the RLC PDUs in the order of reception (in the order of arrival regardless of the order of SNs) and may deliver the RLC PDUs to the PDCP device out of sequence (out-of-sequence delivery). Regarding a segment, the NR RLC device may receive segments which are stored in a buffer or are to be received later, may reassemble the segments into one whole RLC PDU, and may deliver the RLC PDU to the PDCP device. The NR RLC layer may not include the concatenation function, which may be performed by the NR MAC layer or may be replaced with a multiplexing function of the NR MAC layer.

The out-of-sequence delivery function of the NR RLC device refers to a function of delivering RLC SDUs received from a lower layer directly to an upper layer regardless of order, and may include a function of reassembling and delivering separate RLC SDUs if receiving a plurality of separate RLC SDUs into which one original RLC SDU is divided and a function of storing the RLC SN or PDCP SN of the received RLC PDUs, ordering the RLC PDUs, and recording lost RLC PDUs.

The NR MAC 2d-15 and 2d-30 may be connected to a plurality of NR RLC-layer devices configured in one UE, and main functions of the NR MAC may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding An NR physical (PHY) layer 2d-20 and 2d-25 may perform channel coding and modulation of upper-layer data into OFDM symbols to thereby transmit the OFDM symbols via a radio channel or may perform demodulation and channel decoding of OFDM symbols received through a radio channel to thereby transmit the OFDM symbols to an upper layer.

Although not shown in the drawing, there is an RRC layer above the PDCP layer of each of the UE and the NR NB, and the RRC layer may transmit and receive connection and measurement-related configuration control messages for radio resource control.

FIG. 2E illustrates UEs, network structures, and data radio bearers in LTE, eLTE, and NR according to the disclosure.

As illustrated in FIG. 2E, in the disclosure, wireless mobile communication systems may be divided into an eNB 2e-05 and an LTE UE 2e-20 that support LTE from Rel-8 to Rel-14, an upgraded eNB 2e-10 and an eLTE UE 2e-25 that support post-Rel-15, and a gNB 2e-15 and an NR UE and 2e-30 that support NR. Specifically, the upgraded eNB and the eLTE UE are defined to support a greater number of data radio bearers (DRBs) than in LTE.

In a next-generation mobile communication system, an NR core network 2e-40 needs to be able to be connected with an LTE radio access network (evolved packet core (EPC)) 2e-35 and an NR radio access network (new RAT radio access network (NR RAN)) 2e-10, and the UEs 2e-25 and 2e-30 capable of being connected to the NR CN need to be able to be simultaneously connected to the NR core network 2e-40 and the LTE core network 2e-35. That is, the NR UE needs to be able to use non-access stratum (NAS) connection to both the EPC and the NR CN. In order to enable connection to both the NR CN and the EPC, the gNB needs to be used, or the eNB as an existing LTE base station needs to be upgraded for NR CN connection. The upgraded LTE base station may also support an increased number of DRBs.

Base stations and UEs that support from 3G/UMTS to 4G/LTE technologies commonly support up to eight DRBs. That is, various services are delivered to an RAN and a UE through the same DRBs, and there has been no significant demand for dividing more than eight DRBs until Rel-14 LTE. Since service continuity is the most important factor, eight DRBs are sufficient to divide and manage services. However, as services are diversified and it is required to separately manage and protect each service rather than managing each service together with another service, there is a need for additional DRBs. This requirement needs to be considered in both LTE and NR. If the number of DRBs increases in LTE, it is possible to provide a service through improved DRBs (11 to 15 DRBs, e.g., 11, 13, or 15 DRBs) in view of a DRB structure in LTE. In NR, an increased number of DRBs (up to 32 DRBs) may be configured according to the requirement and the need of a service provider. For example, 16 or 32 DRBs may be configured. Specifically, if 32 radio bearers (RB) can be configured and three SRBs are allocated, up to 29 DRB can theoretically be configured.

If wireless mobile communication systems support different number of DRBs as described above, a core network needs to receive information about the number of DRBs supported by a particular UE and a corresponding RAN in order to allocate DRBs and a PDU session to the particular UE. For example, if an LTE base station and an LTE UE can support eight DRBs and can connect to up to eight PDU sessions according to a conventional art and if an upgraded LTE base station and an upgraded LTE UE can support 32 DRBs and can connect to up to 32 PDU sessions, an LTE EPC can manage radio resources and PDU sessions in view of this information. Likewise, if an NR 5G CN knows that the numbers of DRBs and the numbers of PDU session connections supported by an NR base station and an NR UE are different from the number of DRBs and the numbers of PDU session connections supported by an eLTE base station and an eUE, the core network can manage radio resources and PDU sessions in view of this information.

In the disclosure, when a core network receives information about the maximum number of DRBs and the maximum number of PDU sessions supported by an RAN (radio base station) and a UE and accordingly up to 32 RBs can be configured, particularly, when an LTE base station is connected to an NR core network, a logical channel identifier currently supported by an LTE system includes five bits, which cannot distinguish up to 29 DRBs. That is, Logical Channel ID (LCID) supports up to eight DRBs in the LTE system, and the extension of an LCID is necessary to support additional DRBs.

The extension of an LCID is also necessary in order to support at least 15 DRBs. When an LTE system is connected to an NR core network, an LCID needs to be able to support up to 29 DRBs, which needs to be considered in LCID extension. Therefore, the disclosure proposes a method of designing a new MAC header supporting a 6-bit LCID so that an LTE system supports additional DRBs (up to 29 DRBs) that can be configured in an NR core network.

FIG. 2F-A illustrates an MAC sub-header structure in an LTE system according to the disclosure, FIG. 2F-B illustrates an MAC sub-header structure in an LTE system according to the disclosure, FIG. 2F-C illustrates an MAC sub-header structure in an LTE system according to the disclosure, and FIG. 2F-D illustrates an MAC sub-header structure in an LTE system according to the disclosure.

Referring to FIG. 2F-A to 2F-D, four types of MAC sub-header structures may generally be used in an LTE system. Four types of MAC sub-headers are divided according to the size of an L field for indicating the size of an MAC SDU and support no L bit and 7-bit, 15-bit, and 16-bit L fields 2*f*-50, 2*f*-80, and 2*f*-110. A UE may distinguish a logical channel using a 5-bit LCID 2*f*-05, 2*f*-25, 2*f*-55, and 2*f*-85, and there is also an E field 2*f*-10, 2*f*-30, 2*f*-60, and 2*f*-90 to identify whether there is an additional MAC sub-header after a currently indicated MAC sub-header. If an L field is necessary (FIG. 2F-B and FIG. 2F-C) excluding a case where no L field is necessary (FIG. 2F-A), an F field 2*f*-45 and 2*f*-75 is used to indicate whether a 7-bit L field is used or a 15-bit L field is used according to the size of an MAC SDU indicated by an MAC sub-header. The F field is not excluded when the last sub-header, an MAC CE having a fixed size, and an F2 field are set to 1. The F2 field is set to 1 when the size of an MAC SDU is specified additionally by a 16-bit L field. The F2 field is set to 0 to indicate that the size of an MAC SDU indicated by the MAC sub-header is smaller than 32767 bytes. In the first position of the first octet of the MAC sub-header, a reserved (R) field 2*f*-20, 2*f*-40, 2*f*-70, and 2*f*-100 exist for use for future extensions.

FIG. 2G-A illustrates an MAC sub-header structure having an extended LCID according to an embodiment of the disclosure, FIG. 2G-B illustrates an MAC sub-header structure having an extended LCID according to an embodiment of the disclosure, FIG. 2G-C illustrates an MAC sub-header structure having an extended LCID according to an embodiment of the disclosure, and FIG. 2G-D illustrates an MAC sub-header structure having an extended LCID according to an embodiment of the disclosure.

FIG. 2G-A to FIG. 2G-D propose a method of indicating an extended LCID for an MAC sub-header supporting an extended LCID, in which an F3 field 2*g*-20, 2*g*-40, 2*g*-70, and 2*g*-100 replaces the R field 2*f*-20, 2F-40, 2*f*-70, and 2*f*-100 included in the MAC sub-header in the LTE system illustrated in FIG. 2F-A to FIG. 2F-D and is combined with an LCID.

This method can support an extended LCID merely by changing the R field to the F3 field rather than modifying the structure of an MAC sub-header defined in an LTE system. When the F3 field 2*g*-20, 2*g*-40, 2*g*-70, and 2*g*-100 is set to 1, an extended LCID (six bits) may be indicated using F3 (one bit)+LCID (five bits) 2*g*-05, 2*g*-25, 2*g*-55, and 2*g*-85. When the F3 field is set to 0, an existing 5-bit LCID is used. That is, an LCID field is used in the same manner as an LCID used in the existing LTE system. The F3 field may indicate the MSB or the LSB. For example, the MSB may be applied in view of scalability.

Specifically, FIG. 2G-A illustrates a case where there is no additional MAC SDU after the MAC sub-header, in which case an extended DRB ID is not indicated. That is, the F3 field may be set to 0. However, the F3 field 2*g*-20 is positioned at the beginning of the first octet in order to conform to the overall MAC sub-header format.

FIG. 2G-B, FIG. 2G-C, and FIG. 2G-D illustrate an MAC sub-header format in which an extended LCID is applied, and the F3 field may be configured as described above. That is, the extended LCID is indicated by combining whether the F3 field is set to 1 and the LCID 2*g*-05, 2*g*-25, 2*g*-55, and 2*g*-85, and other fields of the MAC sub-header may be configured as described in FIG. 2F-A to FIG. 2F-D.

FIG. 2H-A illustrates another MAC sub-header structure having an extended LCID according to an embodiment of the disclosure, FIG. 2H-B illustrates another MAC sub-header structure having an extended LCID according to an embodiment of the disclosure, FIG. 2H-C illustrates another MAC sub-header structure having an extended LCID according to an embodiment of the disclosure, and FIG. 2H-D illustrates another MAC sub-header structure having an extended LCID according to an embodiment of the disclosure.

This embodiment illustrates a method for an MAC sub-header supporting an extended LCID in which an F3 field 2*h*-20, 2*h*-50, 2*h*-90, and 2*h*-130 replaces the R field 2*f*-20, 2*f*-40, 2*f*-70, and 2*f*-100 included in the MAC sub-header in the LTE system illustrated in FIG. 2F-A to FIG. 2F-D and additional one LCID bit 2*h*-30, 2*h*-60, 2*h*-100, and 2*h*-140 for an extended LCID is introduced.

In this method, an additional octet is introduced into the structure of the MAC sub-header defined in the LTE system. Here, the F3 field 2*h*-20, 2*h*-50, 2*h*-90, and 2*h*-130 indicates that there is the additional octet to indicate an extended LCID. That is, the F3 field 2*h*-20, 2*h*-50, 2*h*-90, and 2*h*-130 is set to 1 to indicate that there is one following octet, and an additional LCID field of one bit 2*h*-30, 2*h*-60, 2*h*-100, and 2*h*-140 is present in the octet. A six-bit extended LCID may be indicated by combining the newly designated one-bit LCID 2*h*-30, 2*h*-60, 2*h*-100, and 2*h*-140 and a five-bit existing LCID 2*h*-05, 2*h*-35, 2*h*-75, and 2*h*-115. Here, the newly designated one-bit LCID may indicate the MSB or the LSB. For example, the MSB may be applied in view of scalability.

If the F3 field is set to 0, one octet including an additional LCID is not included, and the same operation as in the LTE system described in FIG. 2F-A to FIG. 2F is performed.

Further, 7-bit reserved (R) fields 2*h*-25, 2*h*-55, 2*h*-95, and 2*h*-135 may be included in the additional one octet.

Specifically, FIG. 2H-A illustrates a case where there is no additional MAC SDU after the MAC sub-header, in which case an extended DRB ID is not indicated. Therefore, the F3 field may be set to 0. In this case, although FIG. 2H-A shows one additional octet, the one additional octet is not actually necessary and thus may be omitted.

FIG. 2H-B, FIG. 2H-C, and FIG. 2H-D illustrate an MAC sub-header format in which an extended LCID is applied, and the F3 field may be configured as described above. That is, the extended LCID is indicated based on whether the F3 field is set to 1 and the one-bit additional LCID 2*h*-30, 2h-60, 2h-100, and 2h-140, and other fields of the MAC sub-header may be configured according to the method described in FIG. 2F-A to FIG. 2F-D. The extended LCID may be set to "one-bit additional LCID+five-bit existing LCID" or "five-bit existing LCID+one-bit additional LCID".

FIG. 2I-A illustrates still another MAC sub-header structure having an extended LCID according to an embodiment of the disclosure, FIG. 2I-B illustrates still another MAC sub-header structure having an extended LCID according to an embodiment of the disclosure, FIG. 2I-C illustrates still another MAC sub-header structure having an extended LCID according to an embodiment of the disclosure, and FIG. 2I-D illustrates still another MAC sub-header structure having an extended LCID according to an embodiment of the disclosure.

This embodiment illustrates a method for designing an MAC sub-header supporting an extended LCID in which an F3 field 2i-20, 2i-55, 2i-100, and 2i-145 replaces the R field 2f-20, 2F-40, 2f-70, and 2f-100 included in the MAC sub-header in the LTE system illustrated in FIG. 2F-A to FIG. 2F-D, and additional one LCID bit 2i-35, 2i-70, 2i-115, and 2i-160 for an extended LCID and an EL field 2i-30, 2i-65, 2i-110, and 2i-155 indicating whether there is an additional LCID bit are used.

In this method, an additional octet is introduced into the structure of the MAC sub-header defined in the LTE system. Here, the F3 field 2i-20, 2i-55, 2i-100, and 2i-145 merely indicates that there is the additional octet. That is, the F3 field 2i-20, 2i-55, 2i-100, and 2i-145 is set to 1 to indicate that there is one following octet.

The additional EL field of one bit 2i-30, 2i-65, 2i-110, and 2i-155 is present in the octet. The EL field indicates whether the additional LCID field of one bit 2i-35, 2i-70, 2i-115, and 2i-160 necessary to configure the extended LCID is included in the additional octet. It may be determined whether the additional LCID field of one bit 2i-35, 2i-70, 2i-115, and 2i-160 is included based on the setting of the EL field. That is, if the EL field is set to 1, a six-bit extended LCID may be indicated by combining the newly designated one-bit LCID 2i-35, 2i-70, 2i-115, and 2i-160 and a five-bit existing LCID 2i-05, 2i-40, 2i-85, and 2i-130. Here, the newly designated one-bit LCID 2i-35, 2i-70, 2i-115, and 2i-160 may indicate the MSB or the LSB. For example, the MSB may be applied in view of scalability.

If the EL field is set to 0, the newly designated one-bit LCID 2i-35, 2i-70, 2i-115, and 2i-160 may not be included or may not be used to interpret the LCID bit. That is, the five-bit existing LCID 2i-05, 2i-40, 2i-85, and 2i-130 is used.

If the F3 field is set to 0, one octet including an additional LCID is not included, and the same operation as in the LTE system described in FIG. 2F-A to FIG. 2F is performed.

Further, 6-bit reserved (R) fields 2i-25, 2i-60, 2i-105, and 2i-150 are included in the additional one octet.

Specifically, FIG. 2I-A illustrates a case where there is no additional MAC SDU after the MAC sub-header, in which case an extended DRB ID is not indicated. Therefore, the F3 field may be set to 0. In this case, although FIG. 2I-A shows one additional octet, the one additional octet is not actually necessary and thus may be omitted.

FIG. 2I-B, FIG. 2I-C, and FIG. 2I-D illustrate an MAC sub-header format in which an extended LCID is applied, and the F3 field may be configured as described above. That is, the extended LCID is indicated based on whether the F3 field is set to 1, whether the EL field is set to 1, and the one-bit additional LCID 2i-35, 2i-70, 2i-115, and 2i-160, and other fields of the MAC sub-header may be configured according to the method described in FIG. 2F-A to FIG. 2F-D. The extended LCID may be set to "one-bit additional LCID+five-bit existing LCID" or "five-bit existing LCID+one-bit additional LCID".

The difference between FIG. 2H-A to FIG. 2H-D and FIG. 2I-A to FIG. 2I-D is associated with future scalability. An additional field may be needed in the future when a functional change of an MAC sub-header is required. In this case, in FIG. 2H-A to FIG. 2H-D, the R fields 2h-25, 2h-55, 2h-95, and 2h-135, which are the reserved bits present in the additional octet, can be applied only to UEs using a 6-bit LCID. That is, when an additional field is needed in an MAC sub-header for UEs using a 5-bit LCID a to support a particular function in the future, it is difficult to apply the additional field.

In FIG. 2I-A to FIG. 2I-D, the F3 field and the EL field are used separately and thus can be flexibly applied. Even in FIG. 2H-A to FIG. 2H-D, in a case where a UE does not support an extended LCID, if a base station sets a corresponding LCID bit of one bit to 0, the UE may operate, disregarding the bit.

FIG. 2J illustrates the operation of a UE supporting an extended logical channel identifier according to an embodiment of the disclosure.

In operation 2j-05, the UE performs RRC connection with a base station. In operation 2j-10, the UE reports the number of DRBs supported by the UE and the maximum number of PDN sessions for connection to a core network through an NAS message. The number of DRBs and the number of PDN sessions may be the same or different. An LTE UE can support eight DRBs and eight PDN sessions and may report the number of supported DRBs and the number of supported PDN sessions. An eLTE UE may report improved capabilities (for example, an eLTE UE can support 11 to 15 DRBs and 11 to 15 PDN sessions). An NR UE may also have improved capabilities from existing LTE and may report the capabilities (for example, an NR UE can support 16 to 21 DRBs and 16 to 21 PDN sessions).

In operation 2j-15, the UE reports the number of DRBs supported by the UE and the maximum number of PDN sessions for connection to the base station through an access stratum (AS) message. The report may be delivered via AS signaling, that is, an RRC message (UE capability report). Here, the UE reports the capabilities through a connected PCell. The cell may be an LTE, eLTE, or NR cell, and the UE delivers information about the capabilities to an eNB, an upgraded eNB, or a gNB. Operations 2j-10 and 2j-15 may be performed sequentially or simultaneously, and only one of the operations may be performed. Even though only one of the operations is performed, the core network can recognize the number of supported DRBs/PDN sessions of the entire system (base station and UE) due to the implementation of the base station.

In operation 2j-20, the UE performs communication according to the DRB configuration of the base station. When the UE receives an MAC PDU from the base station in operation 2j-20, the UE may identify a header and a sub-header in the MAC PDU and may identify an LCID included in the corresponding packet in operation 2j-25.

If the sub-header of the MAC PDU has one of the header structures (in FIGS. 2G-A to 2G-D, 2H-A to 2H-D, and 2I-A to 2I-D) in the disclosure, the UE may identify the fields of the sub-header employing the extended LCID described above and may identify a corresponding DRB in operation 2j-30. Even in uplink transmission, the UE may configure an MAC header of a transmission data packet by applying the same LCID mapping rule to a corresponding DRB in operation 2*j*-30.

In operation 2*j*-25, if the UE identifies that the packet is mapped to a legacy LCID through the MAC header, the UE transmits and receives the packet using the legacy LCID. That is, even in uplink transmission, the UE may configure an MAC header of a transmission data packet by applying the same rule as used for the received LCID in operation 2*j*-35.

FIG. 2K illustrates the overall operation of a base station supporting an extended logical channel identifier according to an embodiment of the disclosure.

In operation 2*k*-05, the base station performs RRC connection with a UE. In operation 2*k*-10, the base station receives the number of DRBs supported by the UE and the maximum number of PDN sessions for connection from the UE through an AS message. The report may be delivered via AS signaling, that is, an RRC message (UE capability report). The cell may be an LTE, eLTE, or NR cell, and information about the capabilities may be delivered to an eNB, an upgraded eNB, or a gNB.

In operation 2*k*-15, the base station transmits, independently or in an integrated manner, the capabilities (the number of DRBs/PDN sessions) received from the UE and the number of DRBs/PDN sessions supported by the base station to a core network. Here, the base station may transmit the capabilities received from the UE as they are, or may modify the capabilities of the UE according to the capabilities supported by the base station and may transmit the modified capabilities. That is, if the number of DRBs/PDN sessions supported by the base station is smaller than the number of DRBs/PDN sessions supported by the UE, the base station may report integrated capabilities of the UE and the base station corresponding to a smaller value. Operations 2*j*-10 and 2*j*-15 may be performed sequentially or simultaneously, and operation 2*j*-10 may be omitted, which occurs only in a case where the UE transmits the capabilities of the UE through an NAS message.

In operation 2*k*-20, the base station receives a mapping rule for radio resource management from the core network (for example, a DRB mapping rule per traffic in LTE and rules for mapping an IP flow and a QoS flow and for mapping a QoS flow and a DRB in NR) and may perform DRB management and communication with the UE according to the received rule.

In this operation, the base station needs to determine whether to use an extended LCID for DRB management. Basically, the base station may not need to configure an extended LCID for all DRBs. For example, for two SRBs and DRBs with a DRB ID of 1 to 8, a legacy LCID may be applied as it is. An extended LCID may be applied only if more than eight DRBs are activated. Further, to support up to 15 DRBs, the following options may be considered.

1. First extended LCID mapping method
   DRBs 9 to 15 are allocated to an extended LCID
   An extended LCID region is used if the base station determines to use more than eight DRBs
   The MAC sub-header structure of the disclosure is employed (the six-bit LCID is used)
2. Second extended LCID mapping method
   DRBs 9 to 11 use a legacy LCID region. In current LTE, signaling of up to 11 DRBs is possible which can be supported using a spare LCID space through redefinition in MAC (that is, the legacy five-bit LCID is reused)
   DRBs 12 to 15 are allocated to an extended LCID (the six-bit LCID of the disclosure is used)
   In summary, an extended LCID is used only when more than 11 DRBs are activated The maximum numbers of DRBs supported by the first extended LCID mapping method and the second extended LCID mapping method may be different. For example, the maximum number may be 29 rather than 15, in which case 15 may be simply replaced with 29 in the above description. That is, the mapping rules may be applied without changing other values.

Further, to support an extended LCID, an additional octet may be required and may cause overhead. Therefore, when a DRB is mapped to an LCID in a network, a delay-sensitive and critical service is allocated to the legacy LCID region, and a less sensitive service may be allocated to an extended LCID.

FIG. 2L is a block diagram illustrating the internal structure of a UE according to the disclosure.

Referring to FIG. 2L, the UE includes a radio frequency (RF) processor 2*l*-10, a baseband processor 2*l*-20, a memory 2*l*-30, and a controller 2*l*-40.

The RF processor 2*l*-10 performs a function for transmitting or receiving a signal through a wireless channel, such as band conversion and amplification of a signal. That is, the RF processor 2*l*-10 upconverts a baseband signal, provided from the baseband processor 2*l*-20, into an RF band signal to transmit the RF band signal through an antenna and downconverts an RF band signal, received through the antenna, into a baseband signal. For example, the RF processor 2*l*-10 may include a transmission filter, a reception filter, an amplifier, a mixer, an oscillator, a digital-to-analog converter (DAC), and an analog-to-digital converter (ADC). Although FIG. 2L shows only one antenna, the UE may include a plurality of antennas. In addition, the RF processor 2*l*-10 may include a plurality of RF chains. Further, the RF processor 2*l*-10 may perform beamforming. For beamforming, the RF processor 2*l*-10 may adjust the phase and strength of each of signals transmitted and received through a plurality of antennas or antenna elements. The RF processor may perform MIMO and may receive a plurality of layers when performing MIMO.

The baseband processor 2*l*-20 performs a function of converting a baseband signal and a bit stream according to the physical-layer specification of a system. For example, in data transmission, the baseband processor 2*l*-20 encodes and modulates a transmission bit stream, thereby generating complex symbols. In data reception, the baseband processor 2*l*-20 demodulates and decodes a baseband signal, provided from the RF processor 2*l*-10, thereby reconstructing a reception bit stream. For example, according to OFDM, in data transmission, the baseband processor 2*l*-20 generates complex symbols by encoding and modulating a transmission bit stream, maps the complex symbols to subcarriers, and constructs OFDM symbols through an inverse fast Fourier transform (IFFT) and cyclic prefix (CP) insertion. In data reception, the baseband processor 2*l*-20 divides a baseband signal, provided from the RF processor 2*l*-10, into OFDM symbols, reconstructs signals mapped to subcarriers through a fast Fourier transform (FFT), and reconstructs a reception bit stream through demodulation and decoding.

As described above, the baseband processor 2*l*-20 and the RF processor 2*l*-10 transmit and receive signals. Accordingly, the baseband processor 2*l*-20 and the RF processor 2*l*-10 may be referred to as a transmitter, a receiver, a transceiver, or a communication unit. At least one of the baseband processor 2*l*-20 and the RF processor 2*l*-10 may include a plurality of communication modules to support a plurality of different radio access technologies. Further, at least one of the baseband processor 2*l*-20 and the RF processor 2*l*-10 may include different communication modules for processing signals in different frequency bands. For example, the different radio access technologies may include a wireless LAN (for example, IEEE 802.11), a cellular network (for example, an LTE network), and the like. In addition, the different frequency bands may include a super high frequency (SHF) band (for example, 2.NRHz) and a millimeter wave band (for example, 60 GHz).

The memory 2*l*-30 stores data, such as a default program, an application, and configuration information for operating the UE. In particular, the memory 2*l*-30 may store information on a second access node performing wireless communication using a second radio access technology. The memory 2*l*-30 provides stored data upon request from the controller 2*l*-40.

The controller 2*l*-40 controls overall operations of the UE. For example, the controller 2*l*-40 transmits and receives signals through the baseband processor 2*l*-20 and the RF processor 2*l*-10. Further, the controller 2*l*-40 records and reads data in the memory 2*l*-30. To this end, the controller 2*l*-40 may include at least one processor. For example, the controller 2*l*-40 may include a communication processor (CP) to perform control for communication and an application processor (AP) to control an upper layer, such as an application.

FIG. 2M is a block diagram illustrating the configuration of a base station according to the disclosure.

Referring to FIG. 2M, the base station includes an RF processor 2*m*-10, a baseband processor 2*m*-20, a backhaul transceiver 2*m*-30, a memory 2*m*-40, and a controller 2*m*-50.

The RF processor 2*m*-10 performs a function for transmitting or receiving a signal through a wireless channel, such as band conversion and amplification of a signal. That is, the RF processor 2*m*-10 upconverts a baseband signal, provided from the baseband processor 2*m*-20, into an RF band signal to transmit the RF band signal through an antenna and downconverts an RF band signal, received through the antenna, into a baseband signal. For example, the RF processor 2*m*-10 may include a transmission filter, a reception filter, an amplifier, a mixer, an oscillator, a DAC, and an ADC. Although FIG. 2M shows only one antenna, the base station may include a plurality of antennas. In addition, the RF processor 2*m*-10 may include a plurality of RF chains. Further, the RF processor 2*m*-10 may perform beamforming. For beamforming, the RF processor 2*m*-10 may adjust the phase and strength of each of signals transmitted and received through a plurality of antennas or antenna elements. The RF processor may transmit one or more layers, thereby performing downlink MIMO.

The baseband processor 2*m*-20 performs a function of converting a baseband signal and a bit stream according to the physical-layer specification of a first radio access technology. For example, in data transmission, the baseband processor 2*m*-20 encodes and modulates a transmission bit stream, thereby generating complex symbols. In data reception, the baseband processor 2*m*-20 demodulates and decodes a baseband signal, provided from the RF processor 2*m*-10, thereby reconstructing a reception bit stream. For example, according to OFDM, in data transmission, the baseband processor 2*m*-20 generates complex symbols by encoding and modulating a transmission bit stream, maps the complex symbols to subcarriers, and constructs OFDM symbols through an IFFT and CP insertion. In data reception, the baseband processor 2*m*-20 divides a baseband signal, provided from the RF processor 2*m*-10, into OFDM symbols, reconstructs signals mapped to subcarriers through an FFT, and reconstructs a reception bit stream through demodulation and decoding. As described above, the baseband processor 2*m*-20 and the RF processor 2*m*-10 transmit and receive signals. Accordingly, the baseband processor 2*m*-20 and the RF processor 2*m*-10 may be referred to as a transmitter, a receiver, a transceiver, a communication unit, or a wireless communication unit.

The backhaul transceiver 2*m*-30 provides an interface for performing communication with other nodes in a network. That is, the backhaul transceiver 2*m*-30 converts a bit stream, transmitted from the main base station to another node, for example, a secondary base station or a core network, into a physical signal and converts a physical signal, received from the other node, into a bit stream.

The memory 2*m*-40 stores data, such as a default program, an application, and configuration information for operating the main base station. In particular, the memory 2*m*-40 may store information on a bearer allocated to a connected UE, a measurement result reported from a connected UE, and the like. In addition, the memory 2*m*-40 may store information as a criterion for determining whether to provide or stop a multi-connection to a UE. The memory 2*m*-40 provides stored data upon request from the controller 2*m*-50.

The controller 2*m*-50 controls overall operations of the main base station. For example, the controller 2*m*-50 transmits and receives signals through the baseband processor 2*m*-20 and the RF processor 2*m*-10 or through the backhaul transceiver 2*m*-30. Further, the controller 2*m*-50 records and reads data in the memory 2*m*-40. To this end, the controller 2*m*-50 may include at least one processor.

According to the disclosure, a method of a UE includes: receiving a system information block (SIB) including barring information per access category; identifying an access category relating to an access attempt; identifying an index included in barring information corresponding to the access category; and determining whether to bar the access attempt based on access control information indicated by the index.

According to the disclosure, a UE in a wireless communication system includes: a transceiver; and a controller configured to receive a system information block (SIB) including barring information per access category, to identify an access category relating to an access attempt, to identify an index included in barring information corresponding to the access category, and to determine whether to bar the access attempt based on access control information indicated by the index.

The methods of the disclosure may not necessarily be carried out in the order as illustrated in the drawings. The operations of the methods may be performed in a different order or in parallel.

Further, some of the elements illustrated in the drawings to describe the methods of the disclosure may be omitted, and only some of the elements may be included without departing from the spirit and scope of the disclosure.

In addition, the methods of the disclosure may be carried out by combining some or all of the details included in the embodiments without departing from the spirit and scope of the disclosure.

The embodiments disclosed in the specifications and drawings are provided merely to readily describe and to help a thorough understanding of the disclosure but are not intended to limit the scope of the disclosure. Therefore, it should be construed that, in addition to the embodiments disclosed herein, all modifications and changes or modified and changed forms derived from the technical idea of the disclosure fall within the scope of the disclosure.

The invention claimed is:

1. A method performed by a user equipment (UE) in a wireless communication system, the method comprising:
   receiving a system information block (SIB) including a list of barring configurations, each of the barring configurations including an access category and an indicator indicating one of barring information sets;
   identifying an access category corresponding to an access attempt;
   identifying barring information set indicated by an indicator corresponding to the identified access category; and
   determining whether to bar the access attempt based on the barring information set.

2. The method of claim 1, wherein the barring information set includes access identifier, a barring factor, and a barring time.

3. The method of claim 2, wherein the access attempt is allowed in case that the access identifier is 0, and
   the access attempt is allowed in case that the access identifier is not 0 and a random value is smaller than the barring factor.

4. The method of claim 2, wherein in case that the access attempt is barred, a new access attempt is barred based on the barring time.

5. The method of claim 1, wherein the SIB includes a barring configuration per public land mobile network (PLMN).

6. The method of claim 1, wherein the list of barring configurations is configured for all PLMNs.

7. The method of claim 1, further comprising:
   transmitting a radio resource control (RRC) connection establishment message in case that the access attempt is allowed.

8. A user equipment (UE) in a wireless communication system, the UE comprising:
   a transceiver; and
   a controller configured to:
   receive a system information block (SIB) including a list of barring configurations, each of the barring configurations including an access category and an indicator indicating one of barring information sets,
   identify an access category corresponding to an access attempt,
   identify a barring information set indicated by an indicator corresponding to the identified access category, and
   determine whether to bar the access attempt based on the barring information set.

9. The UE of claim 8, wherein the barring information set includes an access identifier, a barring factor, and a barring time.

10. The UE of claim 9,
    wherein the access attempt is allowed in case that the access identifier is 0, and
    wherein the access attempt is allowed in case that the access identifier is not 0 and a random value is smaller than the barring factor.

11. The UE of claim 9, wherein in case that the access attempt is barred, a new access attempt is barred based on the barring time.

12. The UE of claim 8, wherein the SIB includes a barring configuration per public land mobile network (PLMN).

13. The UE of claim 8, wherein the list of barring configurations is configured for all PLMNs.

14. The UE of claim 8, wherein in case that the access attempt is allowed, the controller is configured to transmit a radio resource control (RRC) connection establishment message.

* * * * *